United States Patent
Kitayama

(10) Patent No.: US 11,880,613 B2
(45) Date of Patent: Jan. 23, 2024

(54) IMAGE FORMING APPARATUS, RECORDING MEDIUM RECORDING CONTROL PROGRAM, AND CONTROL METHOD FOR HANDLING AN ERROR DURING A PRINT JOB

(71) Applicant: SHARP KABUSHIKI KAISHA, Osaka (JP)

(72) Inventor: Katsuya Kitayama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/108,794

(22) Filed: Feb. 13, 2023

(65) Prior Publication Data

US 2023/0266928 A1 Aug. 24, 2023

(30) Foreign Application Priority Data

Feb. 21, 2022 (JP) .................................. 2022-024387

(51) Int. Cl.
*G06F 3/12* (2006.01)
(52) U.S. Cl.
CPC ............ *G06F 3/121* (2013.01); *G06F 3/1234* (2013.01); *G06F 3/1247* (2013.01)

(58) Field of Classification Search
None
See application file for complete search history.

(56) References Cited

U.S. PATENT DOCUMENTS

2018/0330210 A1\* 11/2018 Matsui ............... G06K 15/1848

FOREIGN PATENT DOCUMENTS

JP          2014-094574 A      5/2014
JP          2014094574 A  *    5/2014

\* cited by examiner

*Primary Examiner* — Andrew H Lam
(74) *Attorney, Agent, or Firm* — ScienBiziP, P.C.

(57) ABSTRACT

An image forming apparatus includes a CPU, the CPU stores, in an HDD, a print job received via a network connection circuit. The CPU analyzes PDL data for each page of the print job, and executes a PDL process for generating bitmap data. When an unrecoverable error occurs in analyzing of the PDL data, only the PDL process is restarted, a print job in which an unrecoverable error occurs is re-input, and analysis is resumed from the page in which the unrecoverable error occurs. When an unrecoverable error occurs on the same page again, only the PDL process is restarted again, the page in which the previous unrecoverable error occurs is skipped, and analysis and printing of a next page are performed.

4 Claims, 20 Drawing Sheets

FIG. 7

NOTICE PAGE

ANALYSIS AND PRINTING OF
THIS PAGE ARE CANCELLED

JOB ID: 2

PAGE: 3

FIG. 9

JOB STATUS LIST

| JOB ID | SPOOLING STATUS | ANALYSIS STATUS | | PRINT STATUS | | NUMBER OF TIMES OF RESTARTING |
|---|---|---|---|---|---|---|
| | | STATE | PAGE | STATE | PAGE | |
| 1 | SPOOLING COMPLETED | ANALYSIS COMPLETED | 5 | PRINT COMPLETED | 5 | 0 |
| 2 | SPOOLING COMPLETED | IN ANALYZING | 2 | IN PRINTING | 1 | 0 |
| 3 | SPOOLING COMPLETED | WAITING | 0 | n/a | 0 | 0 |
| 4 | SPOOLING COMPLETED | WAITING | 0 | n/a | 0 | 0 |
| 5 | IN SPOOLING | WAITING | 0 | n/a | 0 | 0 |

IMAGE FORMING APPARATUS, RECORDING MEDIUM RECORDING CONTROL PROGRAM, AND CONTROL METHOD FOR HANDLING AN ERROR DURING A PRINT JOB

BACKGROUND OF THE INVENTION

Field of the Invention

The present disclosure relates to an image forming apparatus, a recording medium recording a control program, and control method, and particularly to, for example, an image forming apparatus, a recording medium recording a control program, and a control method for printing, on a recording medium such as paper, an image based on a print job transmitted from an information processing apparatus.

Description of the Background Art

As an example of an image forming apparatus according to the background art, it is known an image forming apparatus that notifies a user of a print job in an apparently normal error state in a case where the apparently normal error state, that is, an unrecoverable error state, of a print job is detected, and restarts only a printer drawing unit to cancel execution of the print job in this error state while capable of executing (printing or canceling) a subsequent print job.

In the image forming apparatus according to this background technology, the print job in the error status is canceled, and print output of a page in which the error occurs and subsequent pages cannot be obtained with a single user operation. For example, in a case where a 100-page print job is executed and only the second page results in an error, a user can only get the first page printed out. The user who receives an error notification needs to execute printing again on the basis of the notified information.

Although not specified in the background art, it is considered that this problem can be solved by controlling the image forming apparatus such that only the printer drawing unit is restarted and then the print job in which the error occurs is input again.

However, it is unclear how a print job in an error state will be handled after restart, for example, whether re-input is performed from a page in which the error occurs or from the page in which the error occurs and subsequent pages. In a case where the print job is re-input from the page with the error and the print job is again in an apparently normal error state on the same page, there is no concrete proposal on how to handle the situation, that is, how to avoid falling into a loop of error→restart→re-input→error→restart→re-input.

Therefore, a principal object of the present disclosure is to provide a novel image forming apparatus, a novel recording medium recording a control program, and a novel control method.

Another object of the present disclosure is to provide an image forming apparatus, a recording medium recording a control program, and a control method capable of obtaining as much printed output as possible, even for a print job in which an unrecoverable error occurs.

SUMMARY OF THE INVENTION

A first disclosure is an image forming apparatus that outputs bitmap data converted from page description language data, and forms an image on a recording medium, the image forming apparatus comprising: an executer that executes a page description language process for analyzing the page description language data for each page of a print job, and generating bitmap data; a restarter that restarts the executer independently to cause the executer to perform analysis from the page of the print job in which an unrecoverable error occurs and to generate bitmap data, in a case where the unrecoverable error occurs in analyzing of the page description language data; and a continuator that causes the executer to perform analysis from a next page of the page of the print job in which the error occurs and to generate bitmap data, in a case where restart by the restarter repeats a predetermined number of times.

A second disclosure is dependent on the first disclosure, and in a case where the executer is restarted by the restarter, and the analysis of the page of the print job is normally completed, the executer is caused to perform analysis for next and subsequent pages of the page and to generate bitmap data.

A third disclosure is a recording medium recording a control program of an image forming apparatus that outputs bitmap data converted from page description language data, and forms an image on a recording medium, the recording medium recording a control program including: causing a processor of the image forming apparatus to execute: an execution step to execute a page description language process for analyzing the page description language data for each page of a print job, and generating bitmap data; a restart step to restart the execution step independently to cause the execution step to perform analysis from the page of the print job in which an unrecoverable error occurs and to generate bitmap data, in a case where the unrecoverable error occurs in analyzing of the page description language data; and a continuation step to cause the execution step to perform analysis from a next page of the page of the print job in which the error occurs and to generate bitmap data, in a case where restart by the restart step repeats a predetermined number of times.

A fourth disclosure is a control method for an image forming apparatus that outputs bitmap data converted from page description language data, and forms an image on a recording medium, the control method including: (a) executing a page description language process for analyzing the page description language data for each page of a print job, and generating bitmap data; (b) restarting the executing (a) independently to cause the executing (a) to perform analysis from the page of the print job in which an unrecoverable error occurs and to generate bitmap data, in a case where the unrecoverable error occurs in analyzing of the page description language data; and (c) causing the executing (a) to perform analysis from a next page of the page of the print job in which the error occurs and to generate bitmap data, in a case where restart by the restarting (b) repeats a predetermined number of times.

According to the present disclosure, as much print output as possible can be obtained even for a print job in which an unrecoverable error occurs.

BRIEF DESCRIPTION OF THE DRAWINGS

FIG. 7 is a diagram for illustrating an example of a notice page.

FIG. 9 is a diagram illustrating an example of a job status list.

DESCRIPTION OF THE PREFERRED EMBODIMENTS

Figure 1:
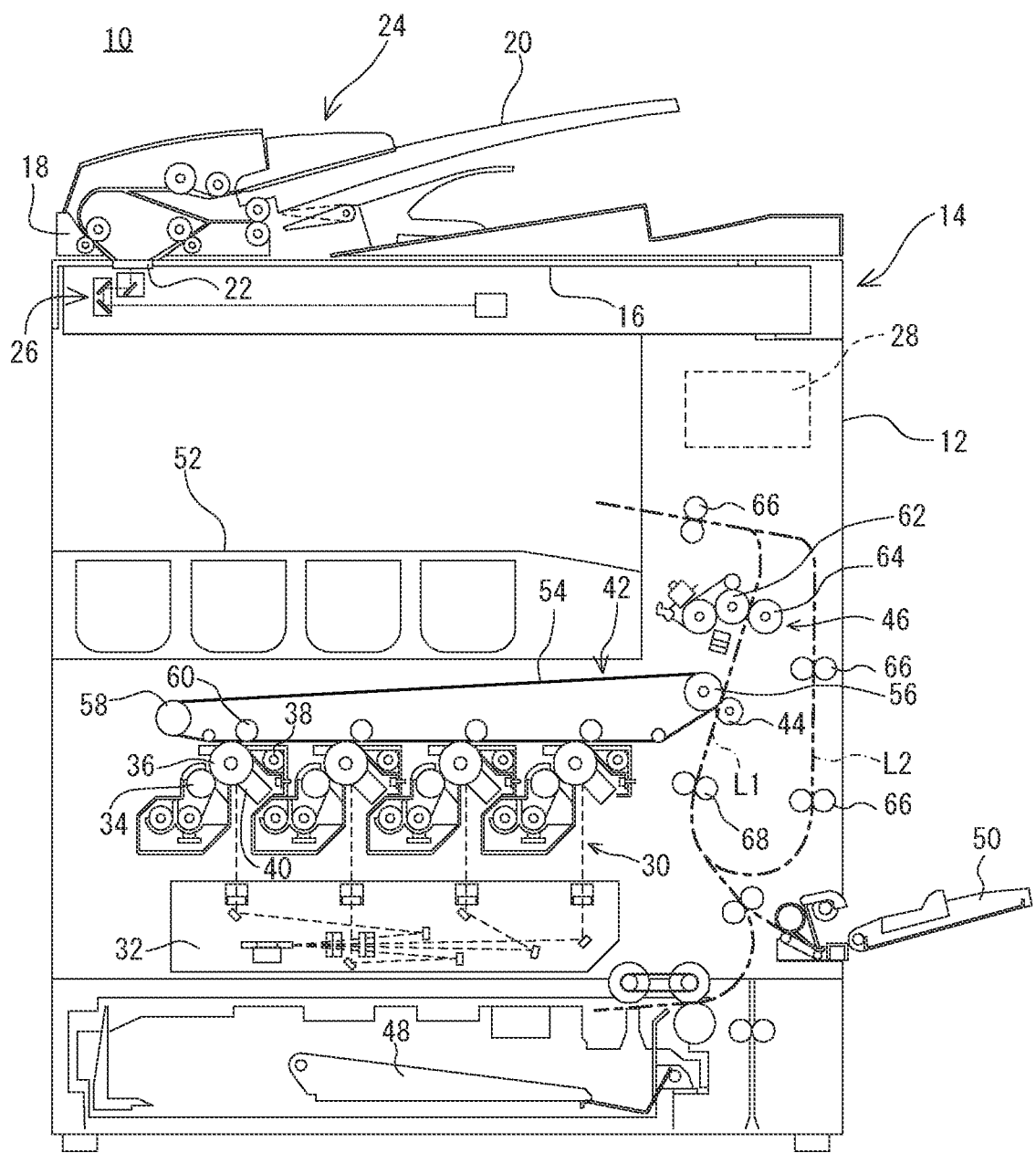
FIG. 1 is a diagram illustrating an image forming apparatus as an embodiment of the present disclosure.

With reference to FIG. 1, an image reading device 14 as an embodiment of the present disclosure is used in an image forming apparatus 10 that forms an image on paper by electrophotographic method. Now, a basic configuration of the image forming apparatus 10 will be described briefly. In this embodiment, the image forming apparatus 10 is a multifunction peripheral (MFP) with copy, printer, scanner, and facsimile functions.

As illustrated in FIG. 1, the image forming apparatus 10 includes an apparatus body 12 provided with an image former 30 and the like, and the image reading device 14 located above the apparatus body.

The image reading device 14 includes a document placement table 16 formed by a transparent material such as platen glass. A document pressing cover 18 is attached in a freely openable/closable manner above the document placement table 16 via a hinge or the like. This document pressing cover 18 is provided with an automatic document feeder (ADF) 24 that automatically feeds documents placed on a document placement tray 20 to an image reading position 22 one by one. Although not illustrated in the figure, an operation acceptor (operation panel) such as a touch panel 100 and operation buttons 104 that accepts input operation such as a printing instruction by a user is provided on the front side of the document placement table 16.

The image reading device 14 incorporates an image reader 26 including a light source, a plurality of mirrors, an imaging lens, a line sensor, and the like. The image reader 26 exposes a document surface to the light source, and guides reflected light, which is reflected from the document surface, to the imaging lens by using the plurality of mirrors. The reflected light is then imaged on a light receiving element of a line sensor by the imaging lens. The line sensor detects the luminance and the chromaticity of the reflected light that is imaged on the light receiving element, and image data based on an image on the document surface is generated. As the line sensor, a Charge Coupled Device (CCD), a contact image sensor (CIS), or the like is used.

The scanner including the light source and the plurality of mirrors is fixedly located below the image reading position 22 when scanning a document fed by the ADF 24, and is moved in the sub-scanning direction when scanning a document placed on the document placement table 16. However, the sub-scanning direction is the left-right direction when the image forming apparatus 10 is viewed from the front, that is, the left-right direction in FIG. 1. The main scanning direction is the front-back direction of the image forming apparatus 10 when viewed from the front, that is, the direction perpendicular to the paper surface in FIG. 1.

The apparatus body 12 incorporates a controller 28 including a CPU 80, memories (a RAM 84 and an HDD 86), the image former 30, and the like, described below (see FIG. 2). The controller 28 transmits a control signal to each part of the image forming apparatus 10 in response to an input operation to the operation acceptor such as the touch panel 100, and causes the image forming apparatus 10 to perform various operations. This controller 28 controls the entire image forming apparatus 10 and is also a control device for the image reading device 14.

The image former 30 includes an exposure unit 32, developers 34, photoreceptor drums 36, cleaner units 38, chargers 40, an intermediate transfer belt unit 42, a transfer roller 44, a fixing unit 46, and the like. The image former 30 forms an image on paper transported from a paper feed tray 48 or a manual paper feed tray 50 and discharges paper with the image formed thereon to a paper discharge tray 52. As the image data used to form the image on the paper, image data read by the image reader 26, image data transmitted from an external computer, or the like is used.

The image data handled by the image forming apparatus 10 corresponds to a color image in four colors including black (K), cyan (C), magenta (M), and yellow (Y). Accordingly, four each of the developers 34, the photoreceptor drums 36, the cleaner units 38, and the chargers 40 are provided to form four types of latent images corresponding to the four colors, and these constitute four image stations.

Each photoreceptor drum 36 is an image carrier in which a photosensitive layer is formed on a surface of a conductive cylindrical base body, and each charger 40 is a member that charges a surface of this photoreceptor drum 36 to a predetermined potential. Each exposure unit 32 is composed of a laser scanning unit (LSU) that includes a laser emitter and a reflection mirror, forms an electrostatic latent image corresponding to the image data on the surface of the photoreceptor drum 36 by exposing the surface of the charged photoreceptor drum 36. The developers 34 visualize the electrostatic latent image, which is formed on the surface of the photoreceptor drum 36, by using toners in four colors (Y, M, C, and K). Each cleaner unit 38 removes a residual toner remaining on the surface of the photoreceptor drum 36 after the development and the image transfer.

The intermediate transfer belt unit 42 includes an intermediate transfer belt 54, a drive roller 56, a driven roller 58, four intermediate transfer rollers 60, and the like, and is disposed above the photoreceptor drums 36. The intermediate transfer belt 54 is provided so as to contact each of the photoreceptor drums 36. The intermediate transfer rollers 60 are used to successively superpose and transfer, on the intermediate transfer belt 54, toner images, each of which is formed on the corresponding photoreceptor drum 36 and has the corresponding color, so that a multicolor toner image is formed on the intermediate transfer belt 54. The transfer roller 44 is provided so as to press the intermediate transfer belt 54 between the drive roller 56 and the transfer roller 44, and the paper passes through a transfer nip part between the intermediate transfer belt 54 and the transfer roller 44, so that a toner image formed on the intermediate transfer belt 54 is transferred to the paper.

The fixing unit 46 includes a heating roller 62 and a pressure roller 64, and are disposed above the transfer roller 44. The heating roller 62 is set to be at a predetermined fixing temperature. When the paper passes through a nip area between the heating roller 62 and the pressure roller 64, the toner image transferred to the paper is melted, mixed, and pressed, and the toner image is thus thermally fixed to the paper.

Inside such an apparatus body 12, there is formed a first paper transport path L1 for feeding the paper from the paper feed tray 48 or the manual paper feed tray 50 to the paper discharge tray 52 via a resist roller 68, the transfer roller 44, and the fixing unit 46. Furthermore, there is formed a second paper transport path L2 for returning the paper, which passes through the fixing unit 46 after a simplex printing of the paper is finished, to the first paper transport path L1 on the upstream side of the transfer roller 44 in the paper transport direction when double-sided printing on the paper is performed. The first paper transport path L1 and the second paper transport path L2 are appropriately provided with a plurality of transport rollers 66 for transporting the paper in the paper transport direction.

When the single-sided printing (image formation) is performed in the apparatus body 12, paper is guided one by one from the paper feed tray 48 or the manual paper feed tray 50 to the first paper transport path L1 and transported to the resist roller 68 by the transport rollers 66. Then, the resist roller 68 transfers the paper to the transfer roller 44 (transfer nip part) at the timing when a leading edge of the paper and a leading edge of the image information on the intermediate transfer belt 54 are aligned, and the toner image is transferred onto the paper. The unfixed toner on the paper is then thermally melted and adhered by passing through the fixing unit 46 (fixing nip part), and the paper is discharged on the paper discharge tray 52.

On the other hand, in the case where double-sided printing is performed, when a rear end of the paper that passes through the fixing unit 46 after the single-sided printing reaches the transport rollers 66 near the paper discharge tray 52, the transport rollers 66 reversely rotates to cause the paper to travel reversely and be guided to the second paper transport path L2. The paper guided to the second paper transport path L2 is transported through the second paper transport path L2 with the transport rollers 66, and then guided to the first paper transport path L1 on the upstream side in the paper transporting direction of the resist roller 68. At this time, the front and back surfaces of the paper are inverted, and therefore printing is performed on the back side of the paper as the paper passes through the transfer roller 44 and the fixing unit 46.

Figure 2:
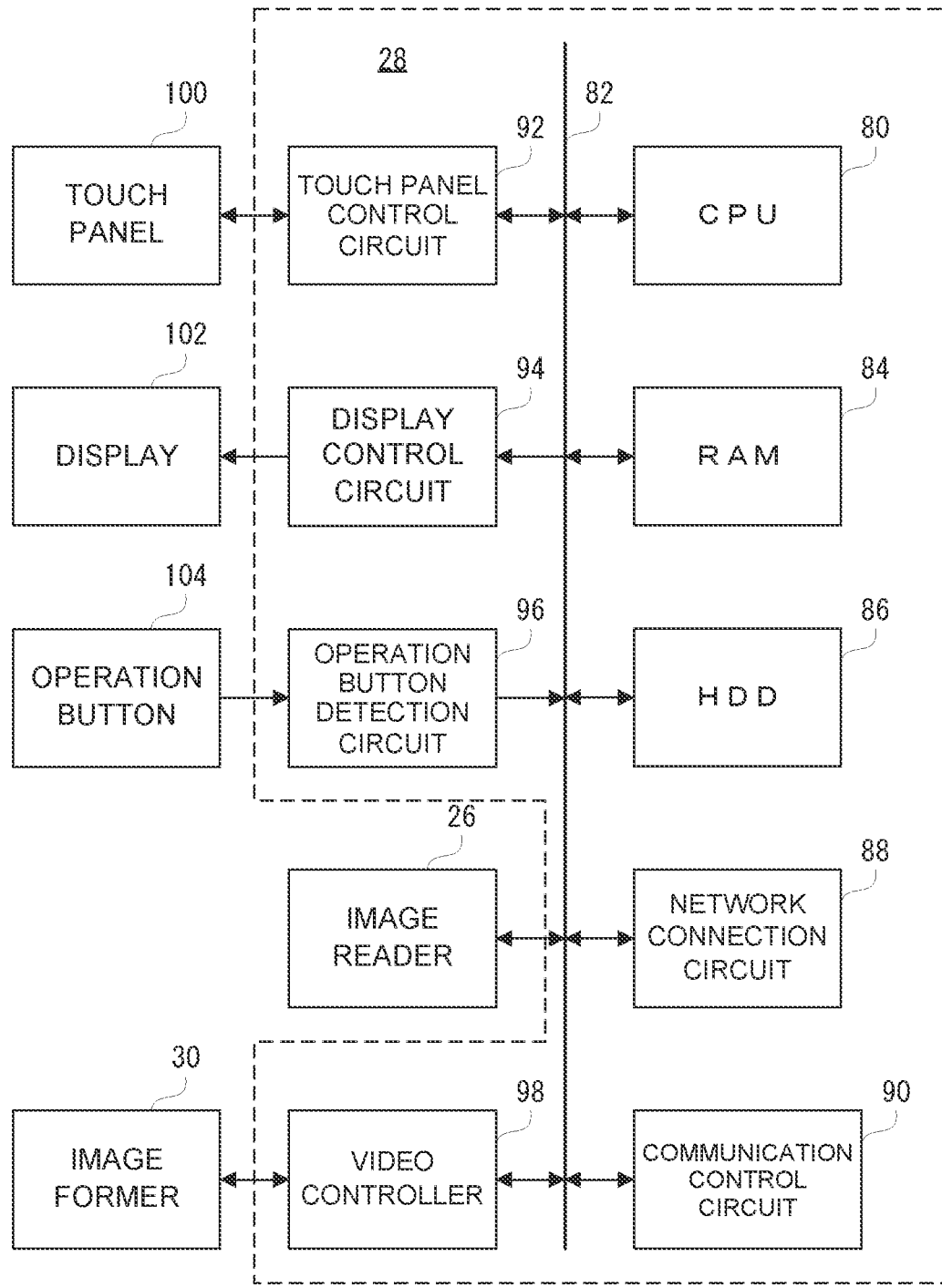
FIG. 2 is a block diagram illustrating an electrical configuration of the image forming apparatus illustrated in FIG. 1.

FIG. 2 is a block diagram illustrating an electrical configuration of the image forming apparatus 10 including the controller 28. With reference to FIG. 2, the image forming apparatus 10 includes the CPU 80. The CPU 80 is connected to the RAM 84, the HDD 86, a network connection circuit 88, a communication control circuit 90, a touch panel control circuit 92, a display control circuit 94, an operation button detection circuit 96, the image reader 26, and a video controller 98 via a bus 82. The touch panel control circuit 92 is connected to the touch panel 100, the display control circuit 94 is connected to a display 102, the operation button detection circuit 96 is connected to the operation buttons 104, and the video controller 98 is connected to the image former 30.

The CPU 80 manages the overall control of the image forming apparatus 10. The RAM 84 is a main storage device of the image forming apparatus 10 and is used as a work area and a buffer area for CPU 80. The HDD 86 is an auxiliary storage device of the image forming apparatus 10, stores various programs for controlling operation of the image forming apparatus 10, stores (i.e., spools) a print job (including image data) transmitted from an external computer via the network connection circuit 88, stores a print job based on image data read by the image reader 26, or stores a print job based on image data received by the communication control circuit 90.

Although not illustrated in the figure, the ROM is also provided in the image forming apparatus 10. The ROM stores a startup program for the image forming apparatus 10.

In this embodiment, the external computer also means a portable terminal, a personal computer, a server, or other image forming apparatus.

The network connection circuit 88 is a communication circuit for connecting to a network such as a LAN and the Internet, and communicates with an external computer using a protocol such as TCP/IP according to an instruction from the CPU 80.

The communication control circuit 90 is a modem, and is connected to a communication line such as a telephone line to transmit and receive image data to and from a facsimile machine of a communication partner, in accordance with an instruction from the CPU 80. The image data received from the fax machine of the communication partner is once stored in the HDD 86. The touch panel control circuit 92 applies a voltage or the like necessary for the touch panel 100, detects touch operation (touch input) within a valid touch range of the touch panel 100, and outputs, to the CPU 80, touch coordinate data indicating a position of the touch input.

The touch panel 100 is a general-purpose touch panel and can adopt any input system such as an electrostatic capacitive system, an electromagnetic induction system, a resistive film system, and an infrared ray system. In this embodiment, a capacitive touch panel of the electrostatic capacitive system is used as the touch panel 100, which is installed on a display surface of the display 102. However, a touch panel display in which the touch panel 100 and the display 102 are integrally formed may be employed.

The display control circuit 94 includes a GPU, a VRAM, and the like. With an instruction from the CPU 80, the GPU uses image generation data stored in the RAM 84 to generate, in the VRAM, display image data for displaying various screens on the display 102, and outputs the generated display image data to the display 102. For example, an LCD or an electro-luminescence (EL) display can be employed as the display 102.

The operation button detection circuit 96 outputs an operation signal or operation data to the CPU 80 in response to the operation of the operation button 104. The operation button 104 is a hardware button or switch such as a power button, for example, on the top or side of the apparatus body 12.

The print job described above is a file including PDL data, specifically described by a page description language (hereinafter referred to as a "PDL") that can be interpreted by the image forming apparatus 10. This file contains PJL (Printer Job Language) data that includes a control command not directly related to image drawing such as information on the selection of a paper feed tray and post-processing such as stapling and punching.

Instead of PJL data, data with an equivalent function can be included in the above file. Equivalent functions can also be achieved by employing PCL (Printer Control Language) data as PDL data.

The video controller 98 transfers the bitmap data read from a video memory (HDD 86 in this example) to the printer engine (i.e., the image former 30). The bitmap data is data converted from PDL data.

The image former 30 receives bitmap data for printing via the video controller 98 and forms a corresponding image on predetermined paper. A detailed configuration of an image forming mechanism in the image former 30 is described above with reference to FIG. 1.

Although omitted from FIG. 2, the controller 28 has a color determination/compression/decompression circuit that performs color determination processing to determine whether bitmap data is color or not and compression/decompression processing for compressing or decompressing bitmap data, and a color conversion/halftone processing circuit that performs color conversion processing for converting an RGB color space into a CMYK color space and performing halftone processing. The CPU 80 is connected to the color determination/compression/decompression circuit and the color conversion/halftone processing circuit via the bus 82.

In such an image forming apparatus 10, in a case where a hang-up or other unrecoverable error occurs during PDL analysis of a page of a print job in the PDL process, the entire system may be restarted. However, as discussed below, a system means a printing system program.

Figure 3:
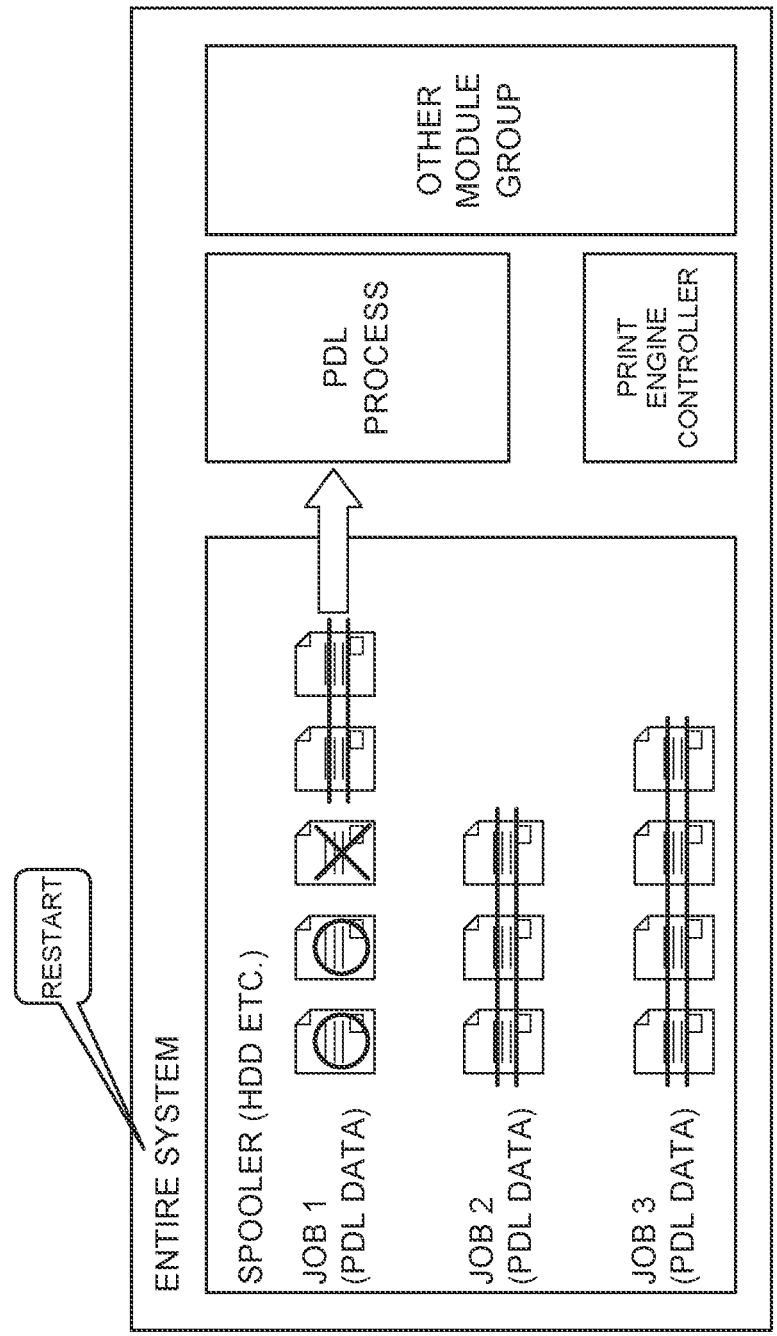
FIG. 3 is a diagram for illustrating an example of processing in a conventional image forming apparatus.

As illustrated in FIG. 3, in a case where three print jobs, that is, Job 1, Job 2, and Job 3 are spooled, when an unrecoverable error occurs during PDL analysis of the third page of Job 1 and the entire system is restarted, the third and subsequent pages of Job 1, Job 2, and Job 3 will be lost. (i.e., canceled). In this case, as a result, print output is obtained only up to the second page of Job 1.

However, in FIG. 3, pages where an unrecoverable error occurs and print output cannot be obtained are marked with x, and pages that are canceled are marked with double lines. In the following, the same applies to this embodiment.

In a case where an unrecoverable error such as hang-up occurs in the PDL process during PDL analysis of a page of a print job, only the PDL process is restarted independently from the system and a print job following a print job in which the unrecoverable error occurs may continue to be executed.

Figure 4:
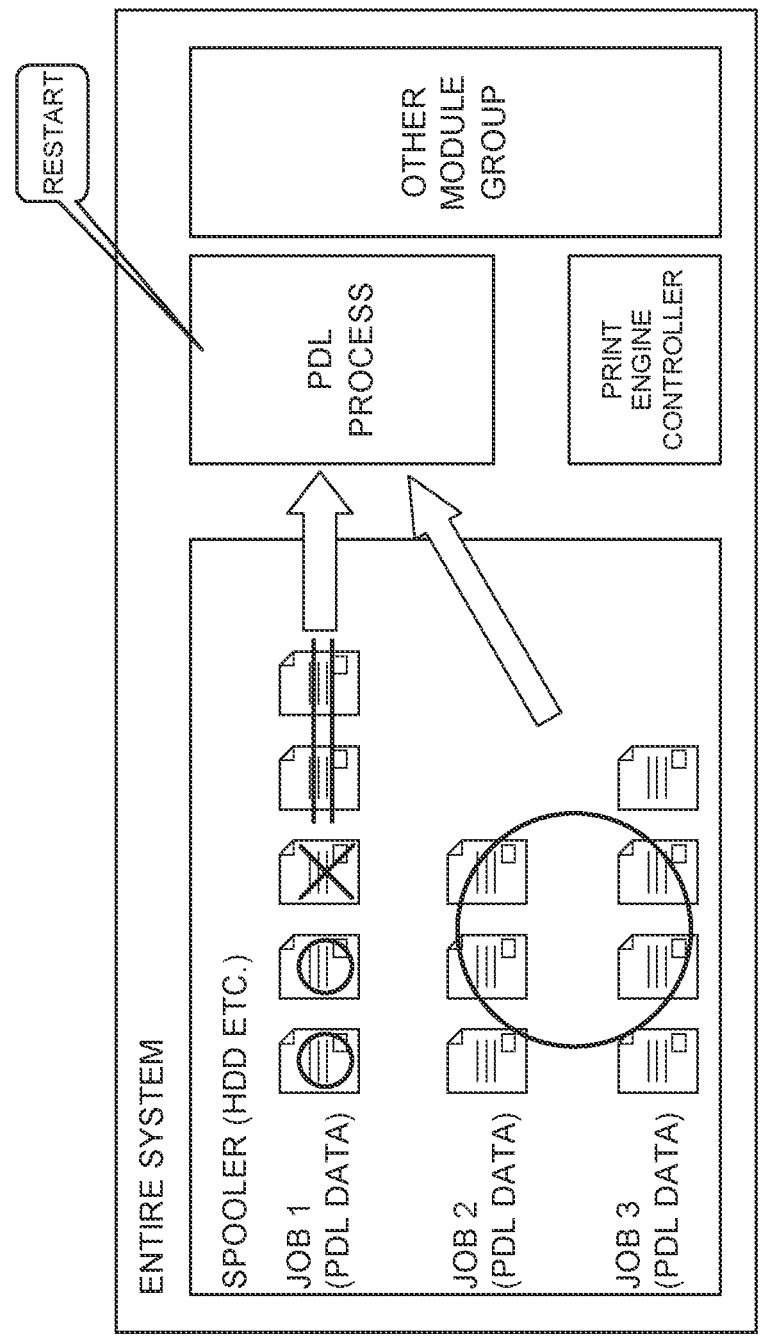
FIG. 4 is a diagram for illustrating another example of processing in the conventional image forming apparatus.

As illustrated in FIG. 4, in a case where three print jobs, that is, Job 1, Job 2, and Job 3, are spooled, an unrecoverable error occurs during PDL analysis of the third page of Job 1, only the PDL process is restarted, and Job 2 and Job 3 continue execution. In this case, when Job 2 and Job 3 are executed normally, all pages of Job 2 and Job 3 are printed, but the third and subsequent pages of Job 1 is lost.

Furthermore, in a case where an unrecoverable error such as hang-up occurs in the PDL process during PDL analysis of a page of a print job, only the PDL process may be restarted independently of the system and the print job with the unrecoverable error may be re-input.

Figure 5:
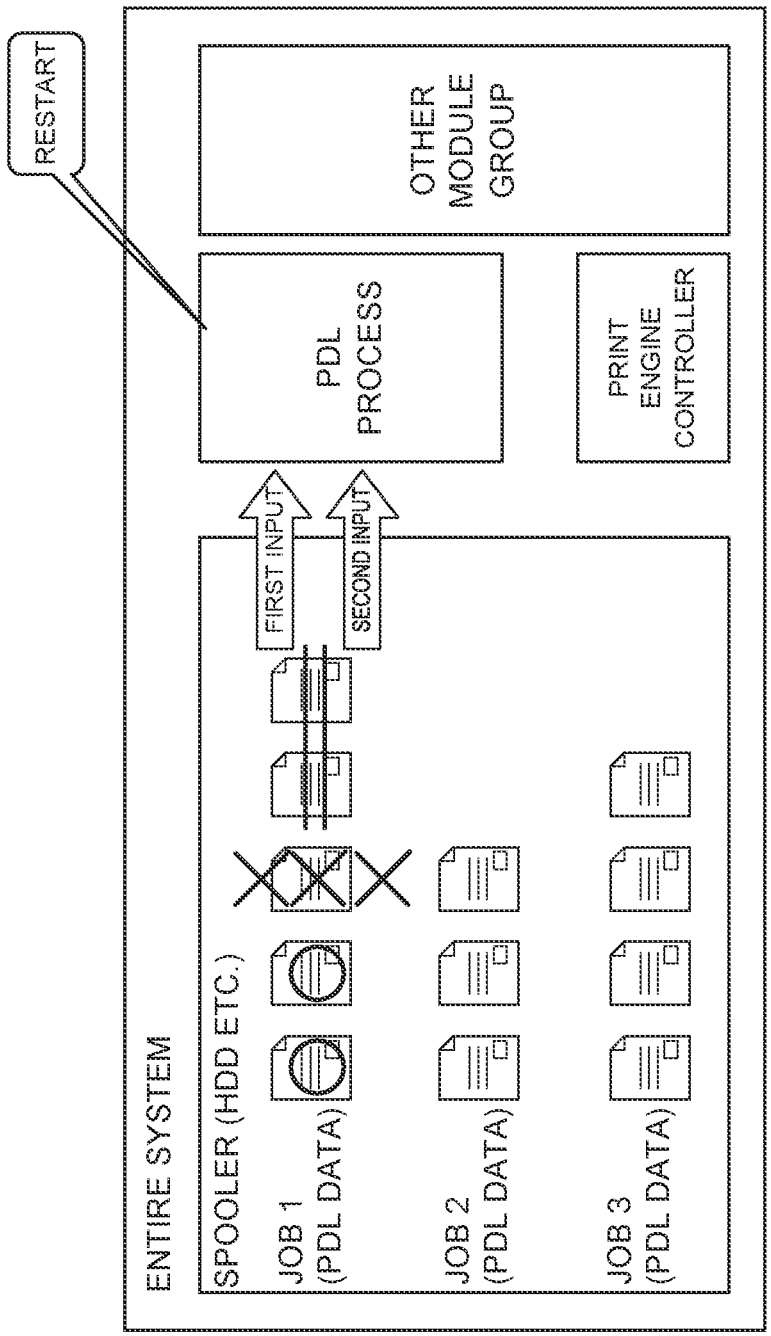
FIG. 5 is a diagram for illustrating another example of processing in the conventional image forming apparatus.

As illustrated in FIG. 5, in a case where three print jobs, that is, Job 1, Job 2, and Job 3 are spooled and an unrecoverable error occurs during PDL analysis of the third page of Job 1, only the PDL process is restarted and Job 1 is re-input, an unrecoverable error occurs again on the page where the previous unrecoverable error occurred, that is, the third page, the restart and the occurrence of the unrecoverable error may be looped. In this case, as in the case illustrated in FIG. 3, the third and subsequent pages of Job 1, as well as Job 2 and Job 3, are lost. Consequently, print output only up to the second page of Job 1 cannot be obtained.

To avoid such inconvenience, in this embodiment, in a case where an unrecoverable error such as hang-up occurs in the PDL process during PDL analysis of a page of a print job, only the PDL process is restarted independently from the system and the print job on which the unrecoverable error occurred last time is restarted. In a case where an unrecoverable error occurs again on the page where the unrecoverable error occurred last time, only the PDL process is restarted again. Furthermore, the print job in which an unrecoverable error occurred last time is re-input, and analysis and printing are executed from a page following the page in which this unrecoverable error occurred.

Figure 6:
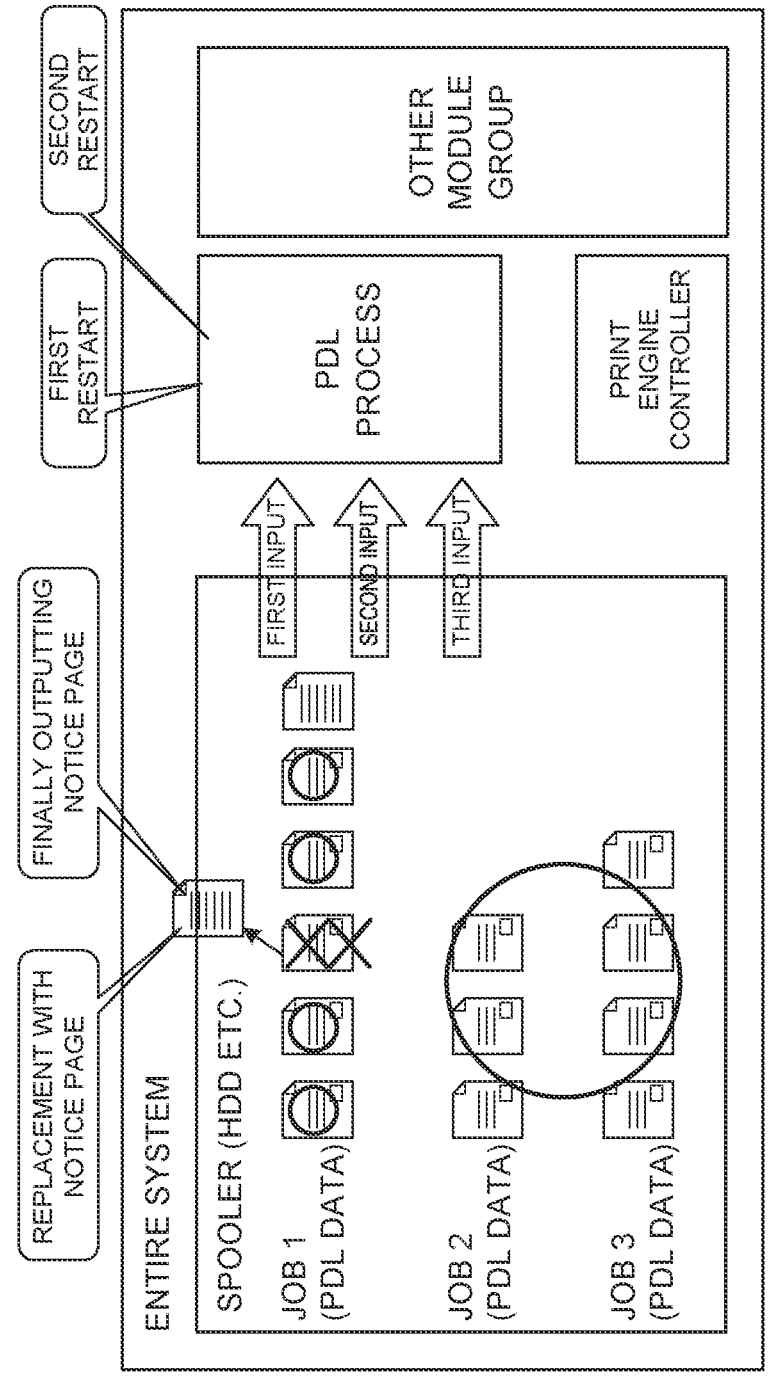
FIG. 6 is a diagram for illustrating an example of processing in the image forming apparatus of this embodiment.

As illustrated in FIG. 6, in a case where three print jobs, that is, Job 1, Job 2, and Job 3, are spooled and an unrecoverable error occurs during PDL analysis of the third page of Job 1, only the PDL process is restarted and Job 1 will be re-input. In a case where an unrecoverable error occurs again during PDL analysis of the page where the unrecoverable error occurred last time, that is, the third page, only the PDL process is restarted again. Then, when Job 1 is re-input, the third page where the unrecoverable error occurred last time is skipped, and analysis and printing are performed on the fourth and subsequent pages.

In addition, a page (hereafter referred to as a "notice page") for informing a user of the skipped page (in this case, the third page) is generated and printed after the third or final page.

FIG. 7 is a diagram illustrating an example of the notice page. As illustrated in FIG. 7, the notice page contains a character string indicating that the analysis and printing (or output) of a relevant page are canceled, identification information (job ID) of a relevant print job, and a character string indicating the relevant page.

The notice page illustrated in FIG. 7 is merely an example and needs not to be limited. Instead of job ID, a character string of a file name may be listed. Instead of the skipped page, a normally analyzed and printed page may also be listed.

In this embodiment, in a case where a print job is restarted for the first time and a print job where a previous unrecoverable error occurred is re-input, analysis and printing are performed on the next and subsequent pages when no unrecoverable error occurs on the page where the previous unrecoverable error occurred. Therefore, in a case where no unrecoverable errors occur on the next and subsequent pages, print output is obtained for all pages of all print jobs.

However, in a case where an unrecoverable error occurs on the next and subsequent other pages, the number of times of restart is reset, and re-input of the restart and print job, and the like are performed, as described using FIG. 6.

Figure 8:
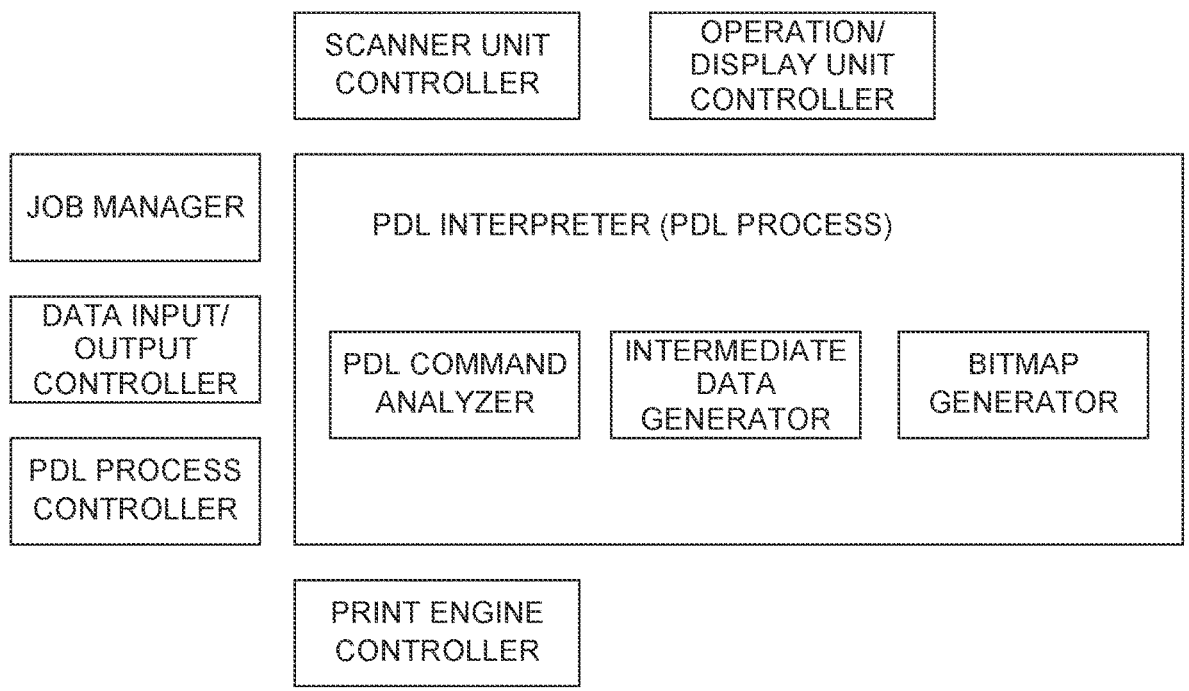
FIG. 8 is a diagram for illustrating a printing system program of this embodiment.

FIG. 8 illustrates a program of the image forming apparatus 10, that is, a printing system ("printing system program"), which is loaded into RAM 84 in the image forming apparatus 10.

As illustrated in FIG. 8, the printing system program includes respective modules of a PDL interpreter, a job manager, a data input/output controller, a PDL process controller, a print engine controller, a scanner unit controller, and an operation/display unit controller.

However, some or all of the modules may be configured in hardware instead of software.

The PDL interpreter (PDL interpreter program 302*c* described below) analyzes the PDL data contained in the print job and generates bitmap data for transmission to the print engine. The PDL interpreter is composed of independent processes (hereinafter referred to as a "PDL process"). The PDL process includes a PDL command analyzer, an intermediate data generator, and a bitmap generator.

The job manager (job management program 302*d* described below) monitors the input of print jobs and transmits a print job start notification to the data input/output controller. In a case where the PDL interpreter is not processing any print job, the job manager transmits a print job start notification to the PDL interpreter.

The job manager also updates a job status list (see FIG. 9) upon receiving an update notification from each module. In a case where the job manager receives a request from the PDL process controller to restart the PDL process, the job manager refers to the job status list and controls restart timing. The job manager also refers to the job status list after the PDL process is restarted, and controls which print jobs to resume and which pages to resume.

When the data input/output controller (data input/output control program 302*e* described below) receives a start notification from the job manager, the data input/output controller reads input data, that is, print jobs, from the input side (e.g., the "external computer" described above) such as a network and stores (spooling) the print jobs in the HDD 86 in job units temporarily stored. The data input/output controller also notifies the job manager of a storage status (i.e., spooled or being spooled) and updates the job status list. The PDL command analyzer also provides an interface for reading data from the HDD 86 for PDL command analysis (hereinafter referred to as "I/F").

When the PDL command analyzer (PDL command analysis program) receives a start notification from the job manager, the PDL command analyzer reads the print job from the HDD 86 through the I/F provided by the data input/output controller and analyzes the PDL command. The job manager is notified of the start of a print job and the job status list is updated when a print job is started.

When the PDL interpreter is restarted as described below, the PDL command analyzer performs analysis from a start page based on the start notification from the job manager and the designation of the start page.

The intermediate data generator (intermediate data generation program) generates intermediate data (display list (DL)) on the basis of a content analyzed by the PDL command analyzer.

The bitmap generator (bitmap generation program) generates bitmap data by performing rendering processing on the basis of the DL generated by the intermediate data generator. The generated bitmap data is saved by the HDD 86. When the bitmap generator completes saving of the bitmap data, the bitmap generator notifies the job manager of the page's completion. The bitmap generator also notifies the print engine controller (print control program 302*g* described below) of the start of printing (or the start of paper discharge) each time the saving of the bitmap data is completed (page by page). Furthermore, the bitmap generator notifies the job manager of the completion of the print job when the bitmap generator completes the saving of all bitmap data.

When the PDL process controller (PDL process control program 302*f* described below) receives a PDL process restart request from the PDL interpreter, the PDL process restart request is transmitted to the job manager, and when a permission response is received, the PDL process is restarted. When the PDL process is restarted, the job ID of the print job that causes this PDL restart process is stored as "stop ID" and the number of pages in an analysis status when an error is unrecoverable is stored as a "stop page". However, in a case where the PDL process is restarted for the second time, the current stop ID and stop page are stored separately from the previous stop ID and stop page. When the PDL process controller completes the restart of the PDL process, the PDL process controller notifies the Job manager of the completion of the restart of the PDL process.

The PDL process controller monitors the job status list, and when the analysis status of a print job is "in analyzing" and a page of the analysis status remains the same and does not change for a certain period of time (e.g., 10 minutes), it is determined that the page has a problem and the processing of the PDL process is stopped, and a restart of the PDL process can be requested by itself.

The print engine controller (print control program 302*g* described below) performs the printing process upon receiving the notification of the start of printing from the bitmap generator. The print engine controller transmits the update request of the job status list to the job manager in accordance with a print status (or discharge status).

FIG. 9 is a diagram illustrating an example of the job status list. The job status list is a list used to manage an execution status of print jobs and is updated and managed by the job manager as described above.

As illustrated in FIG. 9, the job status list describes a spooling status, an analysis status, a printing status, and the number of times of restart corresponding to job ID.

The job ID is identification information assigned to identify each print job. As an example, when the job manager detects a print job, a number is assigned from 1 in ascending order.

The spooling status is a status of input data by the data input/output controller, that is, a storage (spooling) status of a print job in the HDD 86, and is updated in the order of "in spooling" and "spooling completed" in accordance with the storage status.

The analysis status includes the status and pages (the number of pages). The state of the analysis status is updated to "waiting" when the job manager starts a print job. Furthermore, the state of the analysis status is updated to "in analyzing" when the PDL command analyzer starts analysis. Furthermore, the state of the analysis status is updated to "analysis completed" when the bitmap generator completes processing of all pages. The page of the analysis status is incremented from 0 to 1 in accordance with the number of pages that the bitmap generator completes processing.

The print status (or the discharge status) also includes states and pages (the number of pages). The state of the print status is updated to "in printing" when the print engine controller starts the printing processing under the control of the image former 30. The state of the print status is updated to "print completed" when the print engine controller completes the printing process for all pages. The print status page is incremented from 0 to 1 in accordance with the number of pages that the print engine controller has completed printing.

However, before the printing process is started, n/a (not available) is stated as the state of the printing status.

The number of times of restart is incremented from 0 to 1 in accordance with the number of times of restart of the PDL process by the PDL process controller, as described below. In this embodiment, the maximum number of times of restart on the same page is 2, since the maximum number of restarts is 2. In a case where restart requests occur on different pages of the same print job, the number of times of restart is reset to 0 each time there is a first restart request on a different (or new) page.

In the example of the job status list illustrated in FIG. 9, the print job with the job ID of 1 is in a state in which all data analysis and printing (or paper discharge) have been completed for all five pages.

A print job with the job ID of 2 is in printing in a state in which printing of the first page is completed, the second page has been analyzed by the PDL process but has not been printed, and the third page is being processed by one of the modules in the PDL process.

Furthermore, print jobs with the job IDs of 3, 4, and 5 have not been started by the PDL process. For the print jobs with the job IDs of 3 and 4, spooling to the HDD 86 is completed, and for the print job with the job ID of 5, spooling to the HDD 86 is in progress.

In the example of the job status list illustrated in FIG. 9, the number of times of restart is 0 for any of the print jobs, and no restart requests are made.

Figure 10:
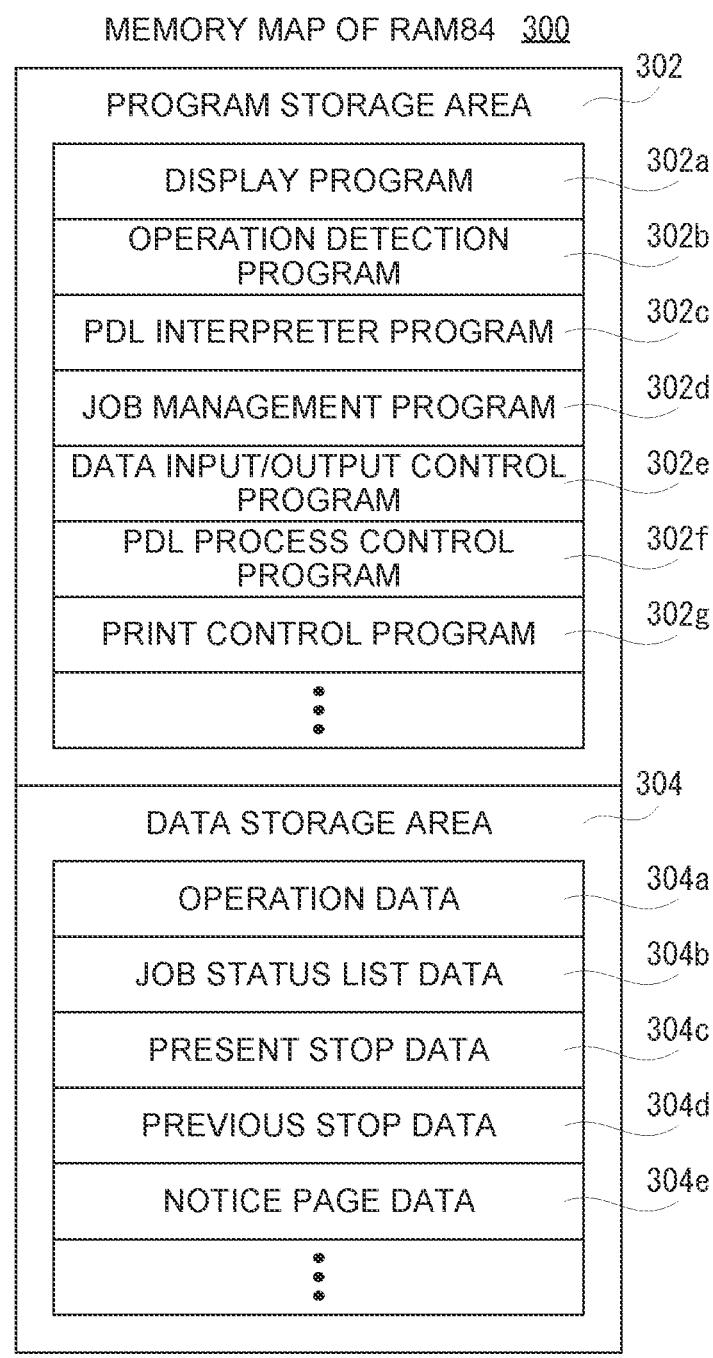
FIG. 10 is a diagram illustrating an example of a memory map of a RAM illustrated in FIG. 2.

FIG. 10 is a diagram illustrating an example of a memory map 300 of the RAM 84 illustrated in FIG. 2. The RAM 84 includes a program storage area 302 and a data storage area 304, and the program storage area 302 stores a control program for the image forming apparatus 10 in this embodiment. However, this control program includes the above printing system program.

As illustrated in FIG. 10, the control programs stored in program storage area 302 include a display program 302a, an operation detection program 302b, the PDL interpreter program 302c, the job management program 302d, the data input/output control program 302e, the PDL process control program 302f, the print control program 302g, and the other program.

The display program 302a is a program for generating display image data corresponding to various screens to be displayed on the display 102 by using image generation data including icons and other components, and outputting the data to the display 102. However, the display program 302a is also a program for outputting, to the display 102, image data corresponding to a scanned image of a document or image data obtained from an external computer.

The operation detection program 302b is a program for detecting user operation input by the touch panel 100 and the operation buttons 104, and detects touch coordinate data input by operating the touch panel 100, or detects operation data or operation signal by operating the operation buttons 104 to temporarily store the detected data or signal in the data storage area 304.

However, the display program 302a and the operation detection program 302b correspond to the operation/display unit controller described above.

The PDL interpreter program 302c is a program for analyzing PDL data included in a print job and generating bitmap data for transmission to the image former 30, as described above, and is composed of the PDL command analysis program, the intermediate data generation program and the bitmap generation program. The PDL command analysis program, the intermediate data generation program, and the bitmap generation program are described above.

The job management program 302d monitors print job input and transmits a print job start notification to the data input/output control program 302e, as described above. However, as described above, in a case where the PDL interpreter program 302c does not process any print jobs, the job management program 302d transmits a print job start notification to the PDL interpreter program 302c.

As mentioned above, the job management program 302d updates the job status list upon receiving an update notification from each of the PDL interpreter program 302c, the data input/output control program 302e, the PDL process control program 302f, and the print control program 302g.

When the data input/output control program 302e receives a start notification from the job management program 302d, as described above, the data input/output control program 302e reads the print job from the input side (i.e., the external computer) such as a network, and stores the input data, that is, the print job, in job units on HDD 86 once. The input data, that is, print jobs, are stored (spooling) in the HDD 86 for each job. The data input/output control program 302e also notifies the job management program 302d of the storage status (i.e., spooled, in spooling) and updates the job status list.

When the PDL process control program 302f receives a PDL process restart request from the PDL interpreter program 302c, the PDL process control program 302f transmits the PDL process restart request to the job management program 302d, and restarts the PDL process when a permission response is received. When the PDL process control program 302f completes the restart of the PDL process, the PDL process control program 302f responds to the job management program 302d that the PDL process restart is completed.

The PDL process control program 302f monitors the job status list, and when the analysis status of a print job is "in analyzing" and a page of the analysis status remains the same and does not change for a certain period of time, PDL process control program 302f can determine that there is a problem with that page and the processing of the PDL process is stopped, and can request the restart of the PDL process by itself.

As described above, the print control program 302g performs the printing process when the print control program 302g receives a notification of the start of printing from the bitmap generation program. In addition, the print control program 302g transmits a update request of the job status list to the job management program 302d in accordance with the print status (or the paper discharge status).

Although not illustrated in the figure, the program storage area 302 also stores other programs for executing the functions provided by the image forming apparatus 10, such as a communication program, an image reading program (corresponding to the scanner unit controller described above), and an image forming program.

The data storage area 304 stores an operation data 304a, a job status list data 304b, a present stop data 304c, a previous stop data 304d, a notice page data 304e, and the like.

The operation data 304a is touch coordinate data input from the touch panel 100 and/or operation data input from the operation buttons 104, detected in accordance with the operation detection program 302b.

The job status list data 304b is data about the job status list as illustrated in FIG. 9.

The present stop data 304c is data about the stop ID that causes restart of the PDL process and the stop page indicating the number of pages where an unrecoverable error occurs, in a case where the PDL process is restarted.

The previous stop data 304d is data about a previous stop ID and a previous stop page. Specifically, when the PDL process is restarted again, a copy of the current stop data 304c is stored as the previous stop data 304d.

The notice page data 304e is image data about the notice page as illustrated in FIG. 7.

Although not illustrated in the figure, the data storage area 304 stores other data such as image generation data necessary to execute the control program, or other flags necessary to execute the control program.

Figure 11:
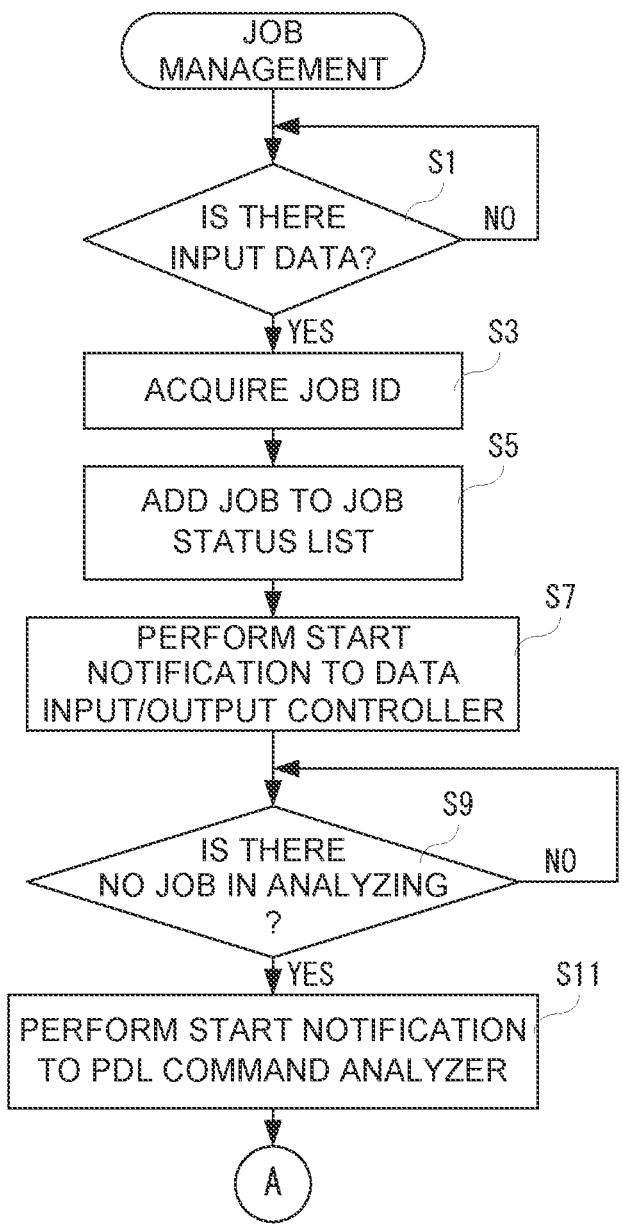
FIG. 11 is a flow chart illustrating a part of an example of job management processing of a CPU illustrated in FIG. 2.
Figure 12:
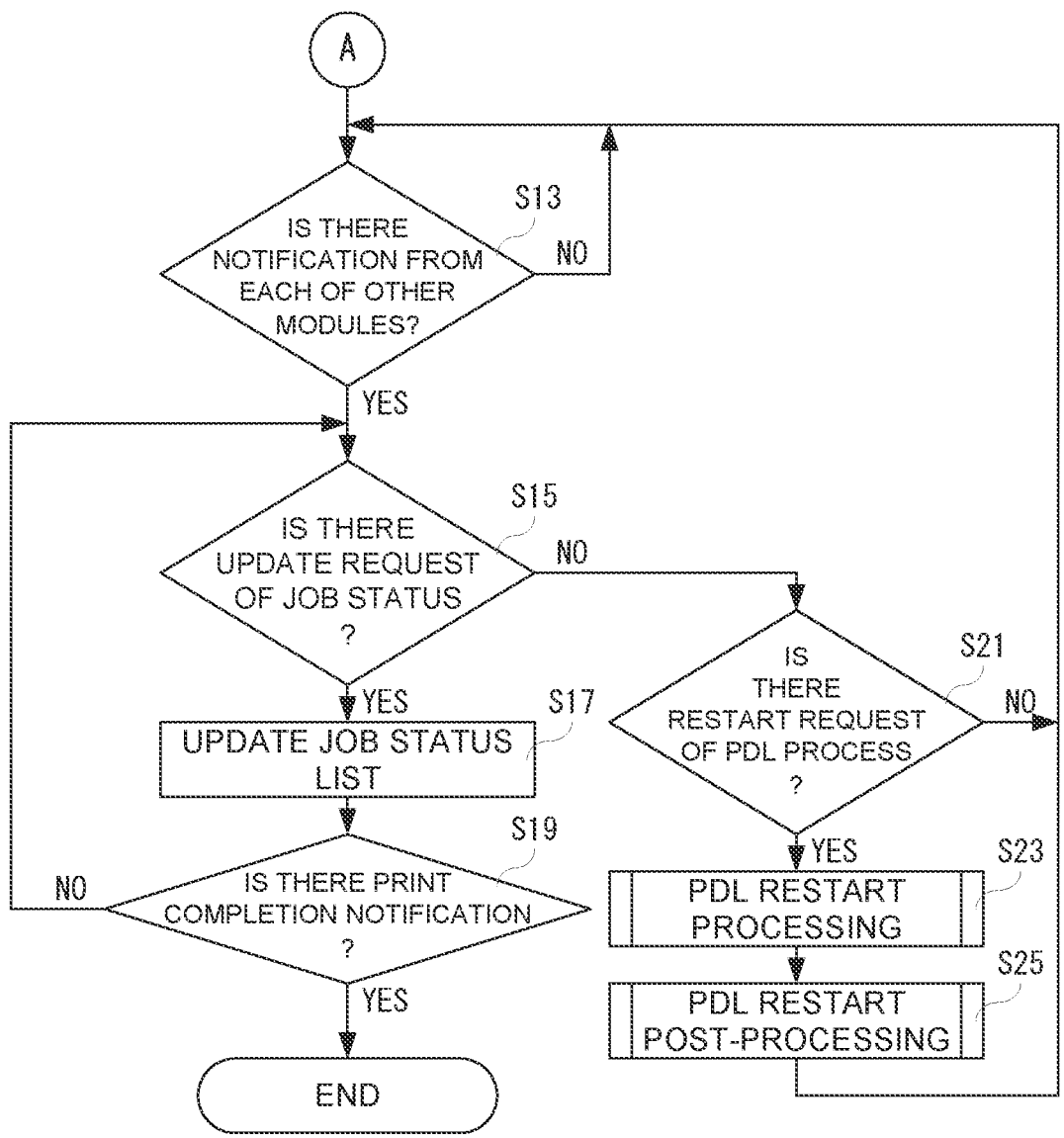
FIG. 12 is another part of the example of job management processing of the CPU illustrated in FIG. 2, and is a flow chart following FIG. 11.

FIG. 11 and FIG. 12 are flow charts each illustrating the job management processing of the CPU 80. As illustrated in FIG. 11, when the CPU 80 stars job management processing, the CPU 80 determines in Step S1 whether or not there is input data (i.e., a print job). Herein, the CPU 80 determines whether or not a print job is received from an external computer.

When the determination is "NO" in Step S1, that is, when there is no input data, the process returns to Step S1. On the other hand, when the determination is "YES" in Step S1, that is, when there is input data, the job ID is obtained in Step S3 and the print job is added to the job status list in Step S5.

As described above, in Step S3, the CPU 80 obtains a job ID that adds one to the maximum value of the current job ID. In Step S5, the CPU 80 adds the number of the job ID obtained in Step S3 and describes the spooling status corresponding to the added job ID as "in spooling". Furthermore, the CPU 80 sets the state of the analysis status to "waiting", sets the page of the analysis status to "0", sets the state of the print status to "n/a", sets the print status page to "0", and sets the number of times of restart to "0", corresponding to the added job ID.

In the next Step S7, the data input/output controller is notified of start. In other words, the CPU 80 executes the data input/output control program 302e. Furthermore, in the next Step S9, it is determined whether or not there are no print jobs in analyzing.

When the determination is "NO" in Step S9, that is, when there is a print job in analyzing, the process returns to Step S9. In other words, the CPU 80 waits for the completion of the analysis of the print job in analyzing. On the other hand, when the determination is "YES" in Step S9, that is, when there is no print job in analyzing, the PDL command analyzer is notified of start in Step S11. In other words, the CPU 80 executes the PDL command analysis program that constitutes the PDL interpreter program 302c.

As illustrated in FIG. 12, the next Step S13 determines whether or not there is a notification from each of other modules. Herein, the CPU 80 determines whether or not whether or not there is a notification from the PDL interpreter program 302c (i.e., the PDL command analysis program, the intermediate data generation program, and the bitmap generation program), the data input/output control program 302e, the PDL process control program 302f, and the print control program 302g.

When the determination is "NO" in Step S13, that is, when there is no notification from each of the other modules, the process returns to Step S13. On the other hand, when the determination is "YES" in Step S13, that is, when there is a notification from each of the other modules, it is determined whether or not there is a job status update request in Step S15.

When the determination is "YES" in Step S15, that is, when there is a job status update request, the job status list is updated in accordance with the update request in Step S17, and it is determined whether or not there is a print completion notification in Step S19.

When the determination is "NO" in Step S19, that is, when there is no print completion notification, the process returns to Step S15. On the other hand, when the determination is "YES" in Step S19, that is, when there is a print completion notification, the job management process is terminated.

When the determination is "NO" in Step S15, that is, when there is no job status update request, it is determined whether or not there is a PDL process restart request in Step S21.

When the determination is "NO" in Step S21, that is, when there is no request to restart the PDL process, return to Step S13. On the other hand, when the determination is "YES" in Step S21, that is, when there is a PDL process restart request, the PDL restart process (see FIG. 13) described below is executed in Step S23, the post PDL restart process (see FIG. 14) described below is executed in Step S25, and the process return to Step S13.

Figure 13:
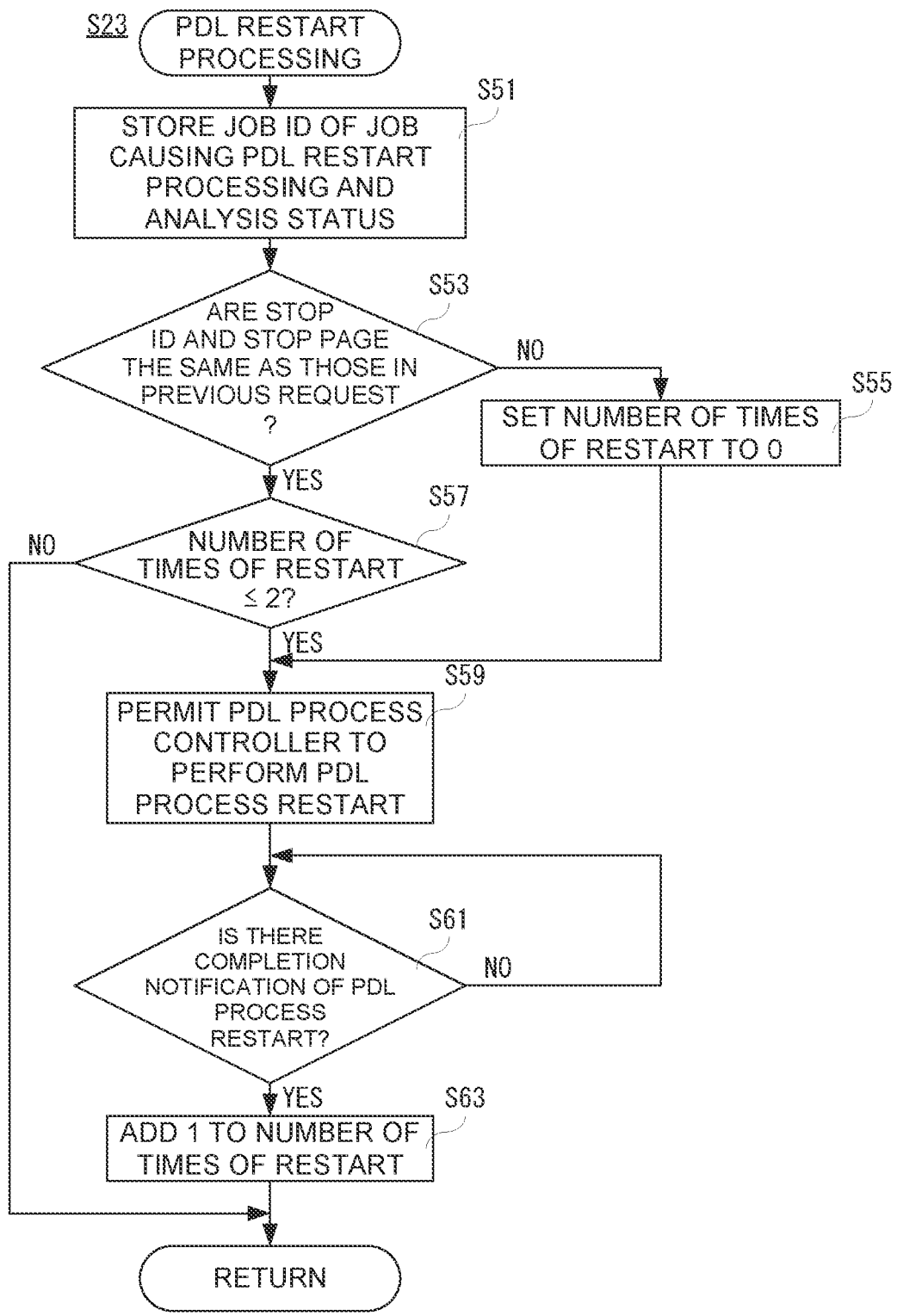
FIG. 13 is a flow chart illustrating an example of PDL restart processing of the CPU illustrated in FIG. 2.

FIG. 13 is a flow chart of the PDL restart processing in Step S23 illustrated in FIG. 12. As illustrated in FIG. 13, when the CPU 80 starts the PDL restart process, the CPU 80 stores the job ID (i.e., the stop ID) and the page of the analysis status (i.e., stop Page) of the print job that causes the PDL restart process in Step S51. In other words, the CPU 80 stores the present stop data 304c in the data storage area 304 of the RAM 84. However, before the current stop data 304c is stored, the CPU 80 stores a copy of the current stop data 304c as the previous stop data 304d.

In the next Step S53, it is determined whether or not the stop ID and the stop page are the same as those in the occurrence of the previous request. When the determination is "NO" in Step S53, that is, when the stop ID and/or the stop page is not the same as those in the occurrence of the previous request, the number of times of restart for the current stop ID is set to 0 in the job status list in Step S55 and the process proceeds to Step S59.

On the other hand, when the determination is "YES" in Step S53, that is, when the stop ID and the stop page are the same as those in the occurrence of the previous request, the number of times of restarts for the stop ID is 2 or less in the job status list in Step S57.

When the determination is "NO" in Step S57, that is, when the number of times of restart is 2 or less, the PDL restart processing is terminated and the process returns to the job management processing. In other words, after the PDL restart is executed.

On the other hand, when the determination is "YES" in Step S57, that is, when the number of times of restart is 2 or less, the PDL process controller is allowed to restart the PDL process in Step S59, and the process proceeds to Step S61. In other words, in Step S59, the CPU 80 executes the PDL process control program 302f, and transmits a PDL process restart request to the job management program 302d. In addition, the CPU 80 restarts the PDL process when a permission response is received.

In Step S61, it is determined whether or not there is the completion notification of the PDL process restart. When the determination is "NO" in Step S61, that is, when there is no completion notification of the PDL process restart, the process returns to Step S61.

On the other hand, when the determination is "YES" in Step S61, that is, when there is the completion notification of the PDL process restart, the number of times of restart corresponding to the stop ID in the job status list is added by 1 in Step S63, and the process returns to the job management process.

Figure 14:
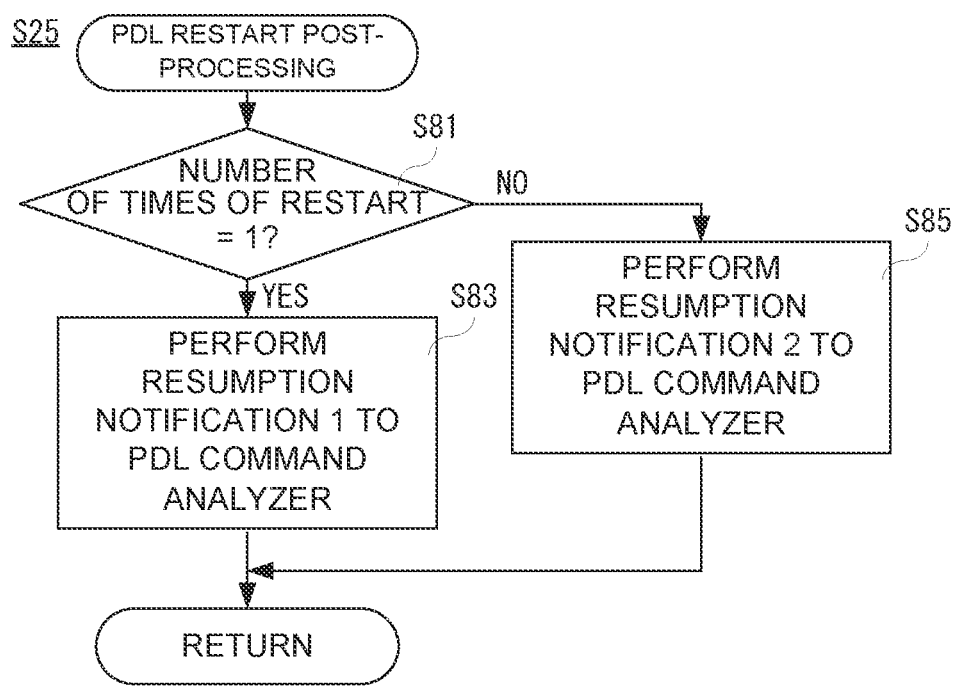
FIG. 14 is a flow chart illustrating an example of PDL restart post-processing of the CPU illustrated in FIG. 2.

FIG. 14 is a flow chart of the PDL restart post-processing in Step S25 illustrated in FIG. 12. As illustrated in FIG. 14, when the CPU 80 starts the PDL restart post-processing, it is determined whether or not the number of times of restart corresponding to the stop ID is 1 in the job status list, in Step S81.

When the determination is "YES" in Step S81, that is, when the number of times of restart is 1, resumption notification (hereafter referred to as "resumption notification 1" for convenience of explanation) is performed to the PDL command analyzer, that is, the PDL command analysis program in Step S83, and the PDL restart post-processing is completed and the process returns to the job management processing.

On the other hand, when the determination is "NO" in Step S81, that is, when the number of times of restart is 2, resumption notification (hereafter referred to as "resumption notification 2" for convenience of explanation) is performed to the PDL command analyzer in Step S85, and the process returns to job management processing.

Figure 15:
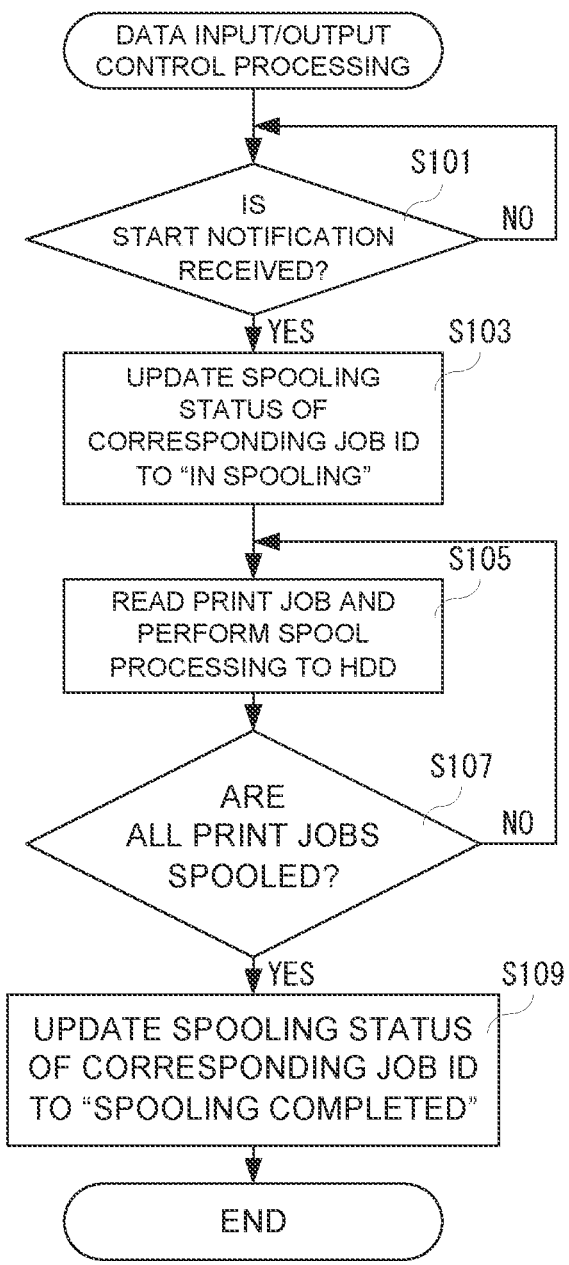
FIG. 15 is a flow chart illustrating an example of data input/output control processing of the CPU illustrated in FIG. 2.

FIG. 15 is a flow chart illustrating an example of the processing of the data input/output controller of the CPU 80, that is, the data input/output control processing. The input/output control processing is executed in parallel with the job management processing.

As illustrated in FIG. 15, when the CPU 80 starts the data input/output control processing, it is determined in Step S101 whether or not the start notification is received. When the determination is "NO" in Step S101, that is, the start notification is not received, the process returns to Step S101. On the other hand, when the determination is "YES" in Step S101, that is, in Step S103, the spooling status of the corresponding job ID is updated to "in spooling".

In the following Step S105, print jobs are read and spooled to the HDD 86, and in Step S107, it is determined whether or not all print jobs are spooled.

When the determination is "NO" in Step S107, that is, when there are still print jobs that are not spooled, the process returns to Step S105, the next print job is read, and spool processing is performed to the HDD 86. On the other hand, when the determination is "YES" in Step S107, that is, when all print jobs are spooled, the spooling status of the corresponding job ID is updated to "spooling completed" in Step S109, and the data input/output control processing is terminated.

Figure 16:
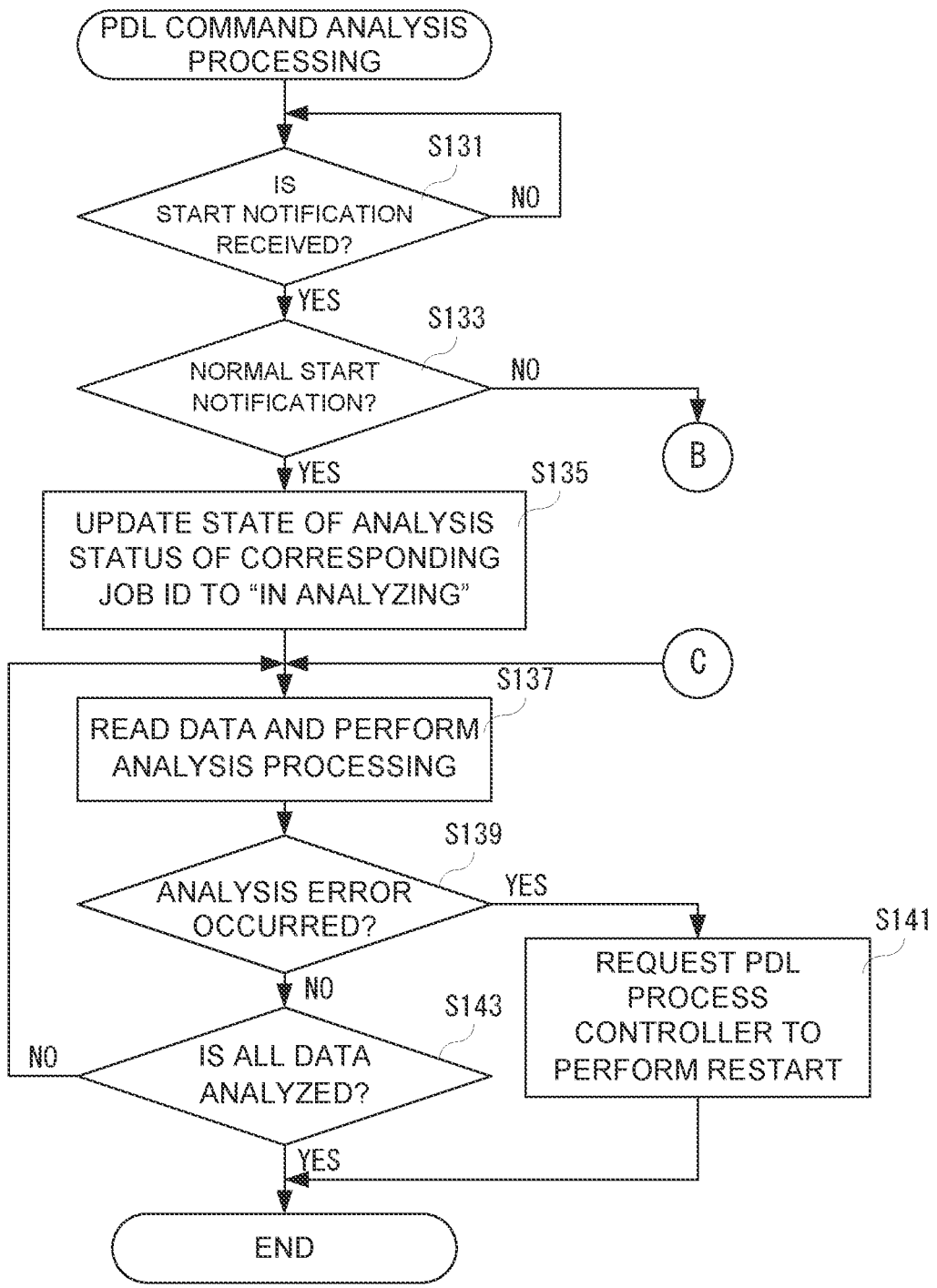
FIG. 16 is a flow chart illustrating a part of an example of PDL command analysis processing of the CPU illustrated in FIG. 2.
Figure 17:
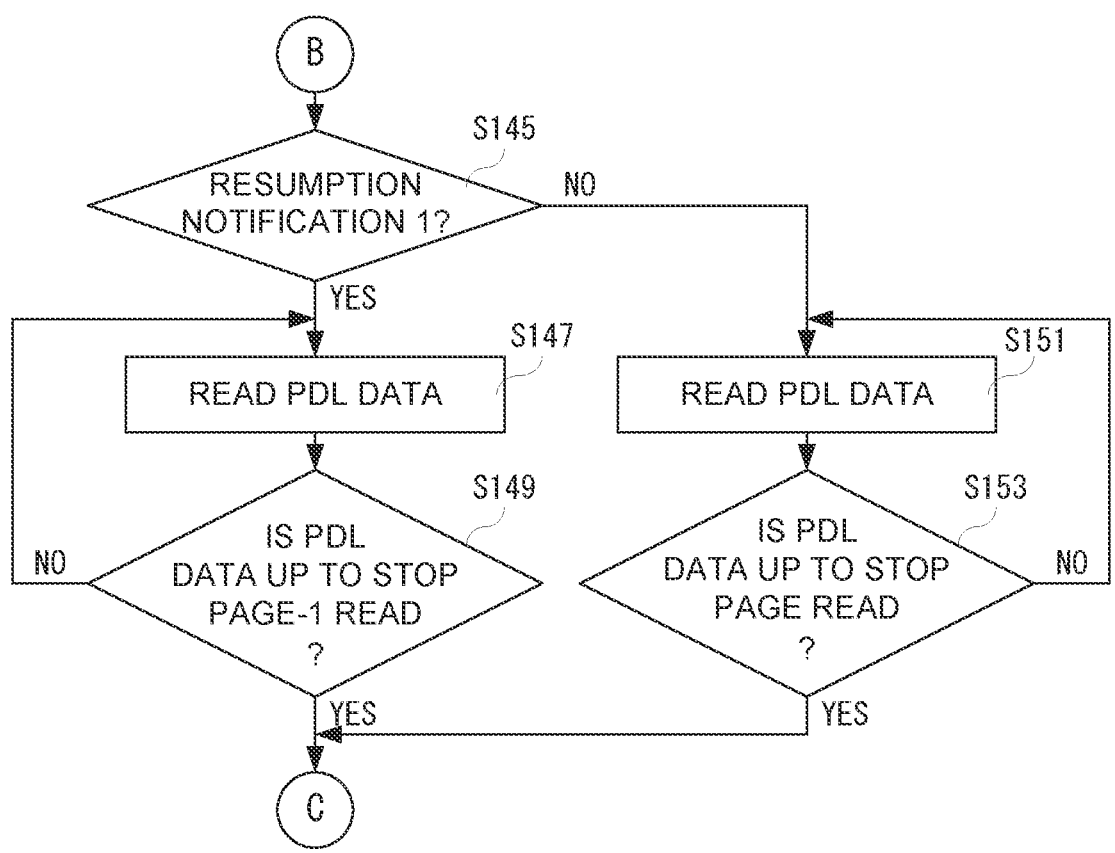
FIG. 17 is a flow chart illustrating another part of the example of PDL command analysis processing of the CPU illustrated in FIG. 2.

FIG. 16 and FIG. 17 are flow charts each illustrating an example of the processing of the PDL command analyzer of the CPU 80, that is, the PDL command analysis processing. The PDL command analysis processing is executed in parallel with the job management processing and after the input/output control processing is executed.

As illustrated in FIG. 16, when the CPU 80 starts the PDL command analysis processing, it is determined in Step S131 whether or not a start notification is received. When the determination is "NO" in Step S131, the process returns to Step S131. On the other hand, when the determination is "YES" in Step S131, it is determined in Step S133 whether or not the start notification is a normal start notification.

When the determination is "NO" in Step S133, that is, when the start notification is not the normal start notification, process proceeds to Step S145 illustrated in FIG. 17. On the other hand, when the determination is "YES" in Step S133, that is, when the start notification is the normal start notification, the state of the analysis status of the corresponding job ID is updated to "in analyzing" in Step S135.

Then, in Step S137, the PDL data is read and the analysis process is executed. In the next Step S139, it is determined whether or not an unrecoverable error occurs. When the determination is "YES" in Step S139, that is, when an unrecoverable error occurs, a restart request is made to the PDL process controller (i.e., PDL process control program 302f) in Step S141, and the PDL command analysis processing is terminated.

When the determination is "NO" in Step S139, that is, when no unrecoverable error occurs, it is determined in Step S143 that all PDL data are analyzed. When the determination is "NO" in Step S143, that is, when there is still PDL data that is analyzed, the process returns to Step S137 to read the next PDL data and the analysis process is executed. When the analysis process is executed, intermediate data is generated on the basis of the analyzed content. On the other hand, when the determination is "YES" in Step S143, that is, when all PDL data are analyzed, the PDL command analysis process is terminated.

As mentioned above, when the start notification is not a normal start notification, the determination is "NO" in Step S133, and it is determined in Step S145 whether or not the start notification is the resumption notification 1, as illustrated in FIG. 17. When the determination is "YES" in Step S145, that is, when the start notification is the resumption notification 1, the PDL data is read in Step S147, and it is determined in Step S149 whether or not the PDL data up to the stop page-1 is read.

When the determination is "NO" in Step S149, that is, when the PDL data up to the stop page-1 is read, the process returns to Step S147, and the next PDL data is read. On the other hand, when the determination is "YES" in Step S149, that is, when the PDL data up to the stop page-1 is read, the process proceeds to Step S137 illustrated in FIG. 16.

When the determination is "NO" in Step S145, that is, when the start notification is the resumption notification 2, the PDL data is read in Step S151, and it is determined in Step S153 whether or not the PDL data up to the stop page is read.

When the determination is "NO" in Step S153, that is, when the PDL data up to the stop page is not read, the process returns to Step S151 and the next PDL data is read. On the other hand, when the determination is "YES" in Step S153, that is, when the PDL data up to the stop page is read, the process proceeds to Step S137.

Figure 18:
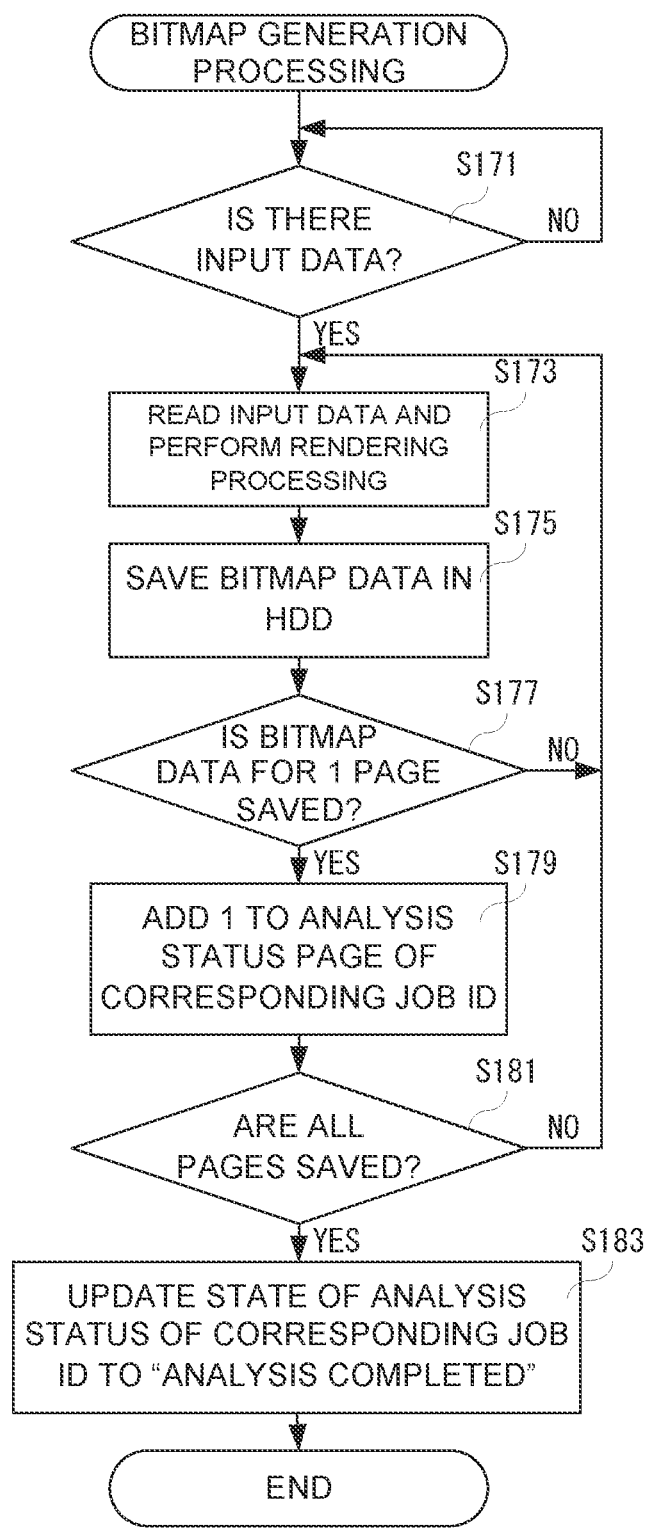
FIG. 18 is a flow chart illustrating an example of bitmap generation processing of the CPU illustrated in FIG. 2.

FIG. 18 is a flow chart illustrating an example of the processing of the bitmap generator of the CPU 80, that is, the bitmap generation processing. The bitmap generation processing is executed in parallel with the job management processing and in parallel with the PDL command analysis processing.

As illustrated in FIG. 18, when the CPU 80 starts the bitmap generation processing, it is determined in Step S171 whether or not there is input data, that is, intermediate data. When the determination is "NO" in Step S171, that is, when there is no input data, the process returns to Step S171. On the other hand, when the determination is "YES" in Step S171, that is, when there is input data, the input data is read and the rendering process is executed in Step S173. Herein, the CPU 80 generates bitmap data.

In the next Step S175, the bitmap data is saved in the HDD 86, and in Step S177, it is determined whether or not one page of the bitmap data can be saved. When the determination is "NO" in Step S177, that is, when one page of the bitmap data is not saved, the process returns to Step S173.

On the other hand, when the determination is "YES" in Step S177, that is, when one page of the bitmap data can be saved, the page of the analysis status of the corresponding job ID is added by 1 in Step S179, and it is determined in Step S181 that all pages are saved.

When the determination is "NO" in Step S181, that is, when there remain pages that are not saved, the process returns to Step S173, the next input data is read and the rendering process is executed. On the other hand, when the determination is "YES" in Step S181, that is, when all pages have been saved, the analysis status of the corresponding job ID is updated to "analysis completed" in Step S183, and the bitmap generation processing is terminated.

Figure 19:
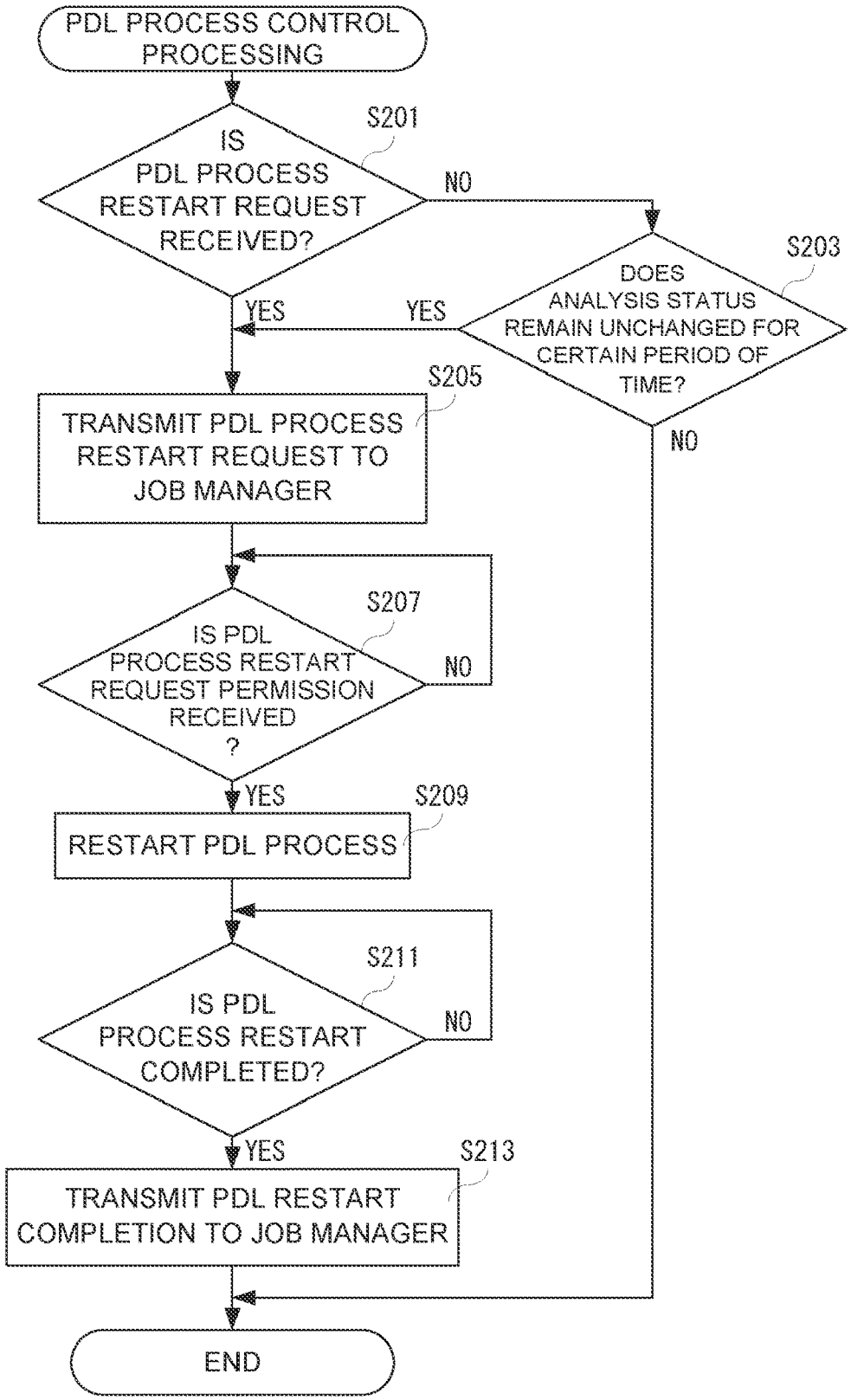
FIG. 19 is a flow chart illustrating an example of PDL process control processing of the CPU illustrated in FIG. 2.

FIG. 19 is a flow chart illustrating the processing of the PDL process controller of the CPU 80, that is, the PDL process control processing. The PDL process control processing is executed in parallel with the job management processing after the bitmap generation processing.

As illustrated in FIG. 19, when the CPU 80 starts the PDL process control processing, it determined in Step S201 whether or not a PDL restart request is accepted. When the determination is "YES" in Step S201, that is, when the PDL process restart request is received, the process proceeds to Step S205.

On the other hand, when the determination is "NO" in Step S201, that is, when the PDL restart request is accepted, it is determined in Step S203 whether or not the analysis status is not changed for a certain period of time (10 minutes in this example). When the determination is "YES" in Step S203, that is, when the analysis status remains unchanged for a certain period of time, the process proceeds to Step S205. On the other hand, when the determination is "NO" in Step S203, that is, when the analysis status is changed before a certain period of time elapses, the PDL process control process is terminated.

In Step S205, the PDL process restart request is transmitted to the job manager. In the next Step S207, it is determined whether or not the PDL process restart request permission is received.

When the determination is "NO" in Step S207, that is, when the PDL process restart request permission is not received, the process returns to Step S207. On the other hand, when the determination is "YES" in Step S207, that is, when the PDL process restart request permission is received, the PDL process is restarted in Step S209.

Then, in Step S211, it is determined that the PDL process restart is completed When the determination is "NO" in Step S211, that is, when the PDL process restart is not completed, the process returns to Step S211. On the other hand, when the determination is "YES" in Step S211, that is, when the PDL process restart is completed, the PDL restart completion is transmitted to the job manager in Step S213, and the PDL process control processing is terminated.

Figure 20:
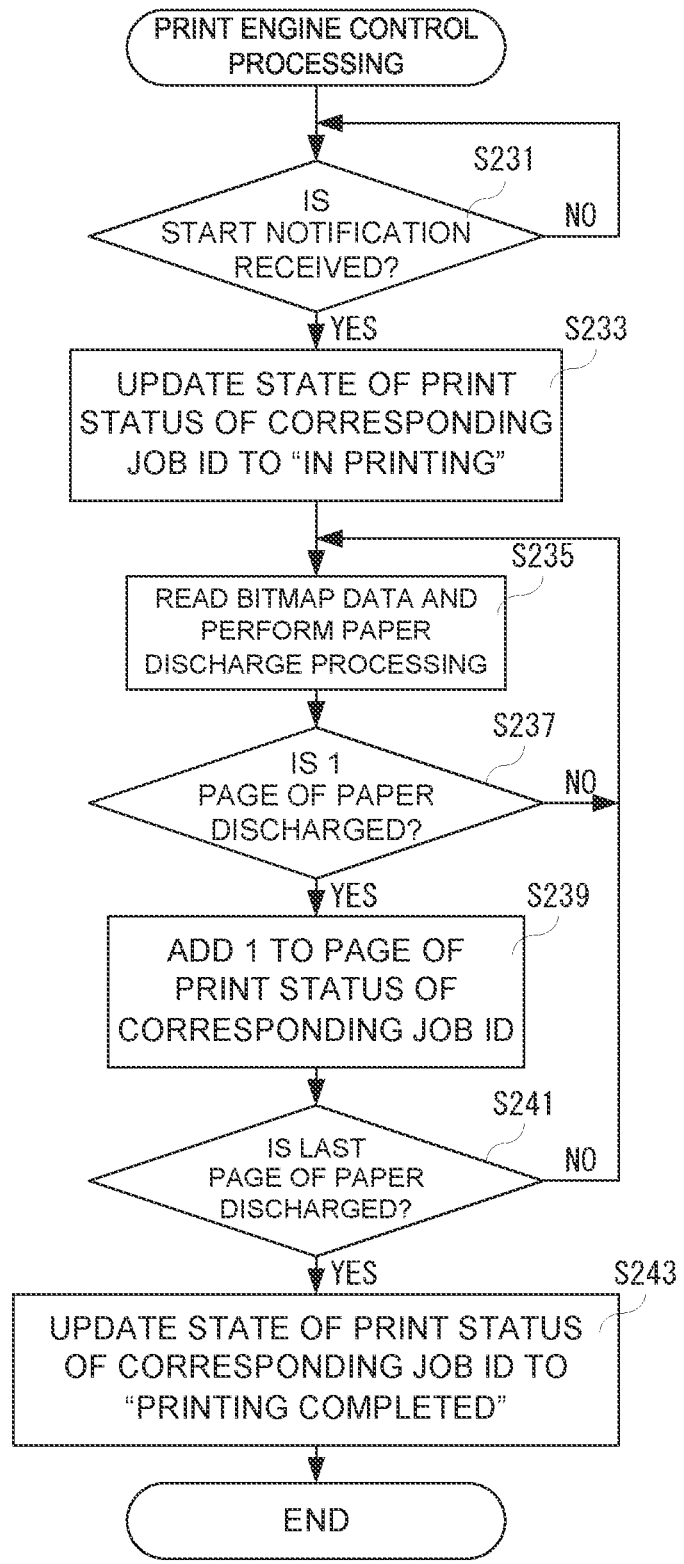
FIG. 20 is a flow chart illustrating an example of print engine control processing of the CPU illustrated in FIG. 2.

FIG. 20 is a flow chart of the process of the print engine controller of the CPU 80, that is, the print engine control processing. The print engine control processing is executed in parallel with the job management processing after the PDL process control processing.

As illustrated in FIG. 20, when the CPU 80 starts the print engine control processing, it is determined in Step S231 whether or not a start notification is received. When the determination is "NO" in Step S231, that is, when no start notification is received, the process returns to Step S231. On the other hand, when the determination is "YES" in Step S231, that is, when the start notification is received, the state of the print status of the corresponding job ID is updated to "in printing" in Step S233, the bitmap data is read in Step S235, and the paper discharge processing (that is, the printing process) is executed The bitmap data is read out and the paper discharge processing (i.e., printing processing) is executed.

In the next Step S237, it is determined whether or not one page of paper has been discharged. When the determination is "NO" in Step S237, that is, when one page has not been discharged, the process returns to Step S235. On the other hand, when the determination is "YES" in Step S237, that is, when one page of paper has been discharged, the page of the print status of the corresponding job ID is added by 1 in Step S239.

Then, in Step S241, it is determined whether the final page has been discharged. When the determination is "NO" in Step S241, that is, when the final page has not been discharged, the process returns to Step S235, the bitmap data of the next page is read, and the paper discharge processing is executed.

On the other hand, when the determination is "YES" in Step S241, that is, when the final page has been discharged, the state of the print status of the corresponding job ID is updated to "print completed" in Step S243, and the print engine control processing is terminated.

According to this embodiment, when the PDL process is restarted the predetermined number of times due to an unrecoverable error occurring on the same page of the same print job, analysis and printing are performed from the next page of that page, and therefore print output of as many pages as possible can be obtained.

In addition, according to this embodiment, a notice page for a page on which an unrecoverable error occurs is also printed, and therefore it is possible to easily know which page does not obtain print output due to the occurrence of an unrecoverable error.

The present disclosure can be provided not only in the form of an image forming apparatus, but also in the form of a program (software) called a control program for the image forming apparatus and a method called a control method for the image forming apparatus.

The program may be provided by being recorded on a computer-readable recording medium, and the program recorded on this recording medium may be read into a computer system and executed to process each part. The "computer system" mentioned herein shall include hardware such as an OS and a peripheral device.

In addition, the "computer-readable recording media" refers to a portable medium such as a USB memory, a flexible disc, a magneto-optical disc, a ROM, a CD-ROM, and other storage device such as a hard disc built into a computer system.

The specific numerical values given in each of the above embodiment are examples and can be changed as appropriate for an actual product.

What is claimed is:

1. An image forming apparatus that outputs bitmap data converted from page description language data, and forms an image on a recording medium, the image forming apparatus comprising:
 an executer that executes a page description language process for analyzing the page description language data for each page of a print job, and generates the bitmap data;
 a restarter that restarts the executer independently to cause the executer to perform analysis from a page of the print job in which an unrecoverable error occurs, and to generate the bitmap data, in a case where the unrecoverable error occurs in analyzing the page description language data; and a continuator that causes the executer to perform the analysis from a next page of the page of the print job in which the unrecoverable error occurs, and to generate the bitmap data, in a case where a restart by the restarter repeats a predetermined number of times.

2. The image forming apparatus according to claim 1, wherein in a case where the executer is restarted by the restarter, and the analysis of the page of the print job is normally completed, the executer is caused to perform the analysis for the next and subsequent pages of the page, and to generate the bitmap data.

3. A recording medium recording a control program of an image forming apparatus that outputs bitmap data converted from page description language data, and forms an image on a recording medium, the control program comprising:

causing a processor of the image forming apparatus to:
execute a page description language process for analyzing the page description language data for each page of a print job, and generating the bitmap data;
restart the execution independently to cause the execution to perform analysis from a page of the print job in which an unrecoverable error occurs, and to generate the bitmap data, in a case where the unrecoverable error occurs in analyzing the page description language data; and
cause the execution to perform the analysis from a next page of the page of the print job in which the unrecoverable error occurs, and to generate the bitmap data, in a case where a restart during the execution restart repeats a predetermined number of times.

4. A control method for an image forming apparatus that outputs bitmap data converted from page description language data, and forms an image on a recording medium, the control method comprising:

executing a page description language process for analyzing the page description language data for each page of a print job, and generating the bitmap data;
restarting the executing independently to cause the executing to perform analysis from a page of the print job in which an unrecoverable error occurs, and to generate the bitmap data, in a case where the unrecoverable error occurs in analyzing the page description language data; and
causing the executing to perform the analysis from a next page of the page of the print job in which the unrecoverable error occurs, and to generate the bitmap data, in a case where restart by the restarting repeats a predetermined number of times.

* * * * *